United States Patent
Xie et al.

(10) Patent No.: US 12,366,175 B1
(45) Date of Patent: Jul. 22, 2025

(54) COMPOSITE STRUCTURE FOR A TURBINE ENGINE

(71) Applicant: General Electric Company, Schenectady, NY (US)

(72) Inventors: Ming Xie, Dayton, OH (US); Mitchell Boyer, Cincinnati, OH (US); Mingchao Wang, West Chester, OH (US); Douglas Lorrimer Armstrong, Needham, MA (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/420,343

(22) Filed: Jan. 23, 2024

(51) Int. Cl.
| | | |
|---|---|---|
| *F01D 9/04* | (2006.01) | |
| *F01D 25/00* | (2006.01) | |
| *B29C 70/36* | (2006.01) | |
| *B29C 70/42* | (2006.01) | |

(52) U.S. Cl.
CPC ........... *F01D 25/005* (2013.01); *F01D 9/041* (2013.01); *B29C 70/36* (2013.01); *B29C 70/42* (2013.01); *F05D 2220/323* (2013.01); *F05D 2230/21* (2013.01); *F05D 2240/12* (2013.01); *F05D 2300/6034* (2013.01)

(58) Field of Classification Search
CPC ...... F01D 9/041; F01D 25/005; F01D 25/285; F05D 2240/12; F05D 2300/601; F05D 2300/6012; F05D 2300/603; F05D 2300/6034; B29C 70/36; B29C 70/42
USPC ................................................. 264/257–258
See application file for complete search history.

(56) References Cited

U.S. PATENT DOCUMENTS

| | | | |
|---|---|---|---|
| 3,718,952 A * | 3/1973 | Palfreyman | B29C 70/202 28/150 |
| 8,870,120 B2 | 10/2014 | Sanderson et al. | |
| 8,905,719 B2 * | 12/2014 | Kray | F01D 5/34 416/230 |
| 9,605,543 B2 * | 3/2017 | Nunez | C04B 35/80 |
| 9,777,585 B2 * | 10/2017 | Drane | F01D 9/041 |
| 11,415,008 B2 * | 8/2022 | Backhouse | F01D 9/041 |
| 11,549,378 B1 | 1/2023 | Sobanski | |
| 12,084,987 B2 * | 9/2024 | Backhouse | B29C 70/205 |

(Continued)

FOREIGN PATENT DOCUMENTS

| | | |
|---|---|---|
| EP | 2785980 B1 | 10/2018 |
| EP | 3215715 B1 | 9/2020 |
| WO | 2018158544 A1 | 9/2018 |

*Primary Examiner* — Brian P Wolcott
(74) *Attorney, Agent, or Firm* — Venable LLP; Edward A. Kmett; Michele V. Frank

(57) ABSTRACT

A method of manufacturing a composite component including an outer shell, an inner hub, and a plurality of struts connecting the outer shell and the inner hub. The method includes installing an outer shell hoop preform on a mold tooling structure, installing an inner hub hoop preform on the mold tooling structure, and inserting strut preforms through outer shell strut slots, and through inner hub strut slots. A first end of the strut preform has bifurcated end portions that are overlayed onto the outer shell hoop preform, and a second end of the strut preform has bifurcated end portions that are overlayed onto one of the outer shell hoop preform or the inner hub hoop preform. A matrix material is injected into the mold tooling structure and a curing process is applied to the mold tooling structure to obtain a molded composite component.

15 Claims, 12 Drawing Sheets

(56) References Cited

U.S. PATENT DOCUMENTS

| | | |
|---|---|---|
| 2013/0149130 A1 | 6/2013 | Hasting et al. |
| 2023/0235677 A1 | 7/2023 | Terada et al. |

\* cited by examiner

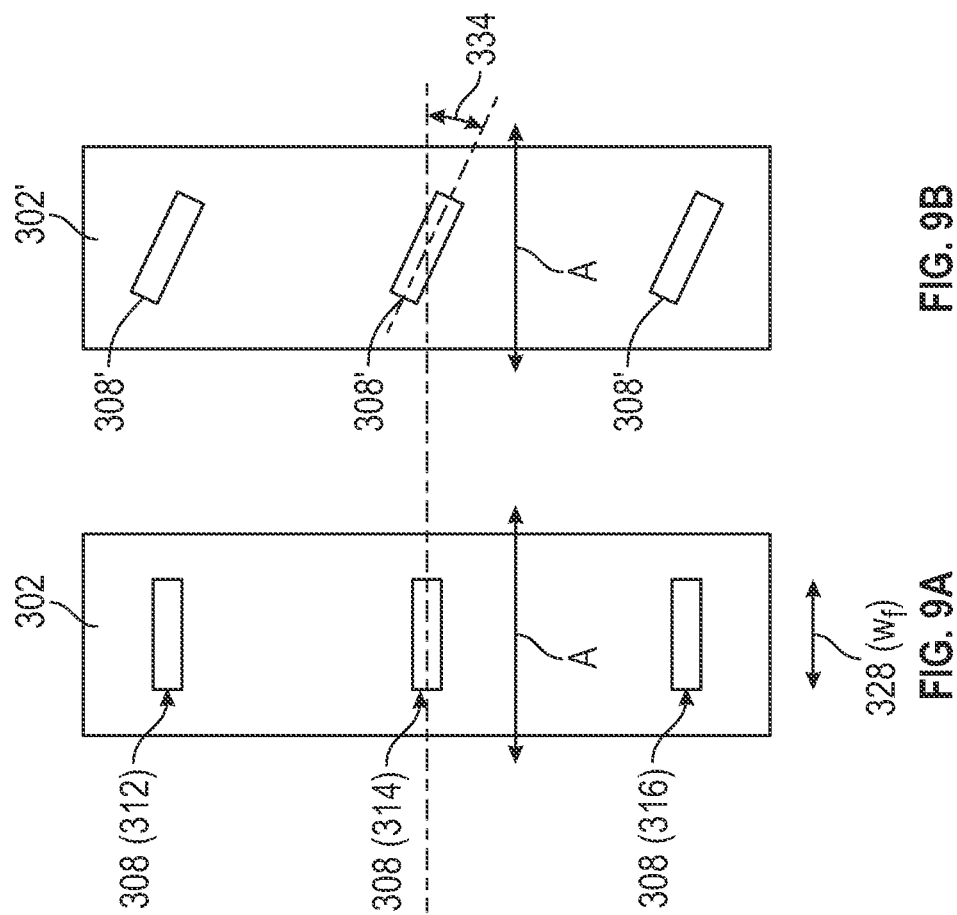
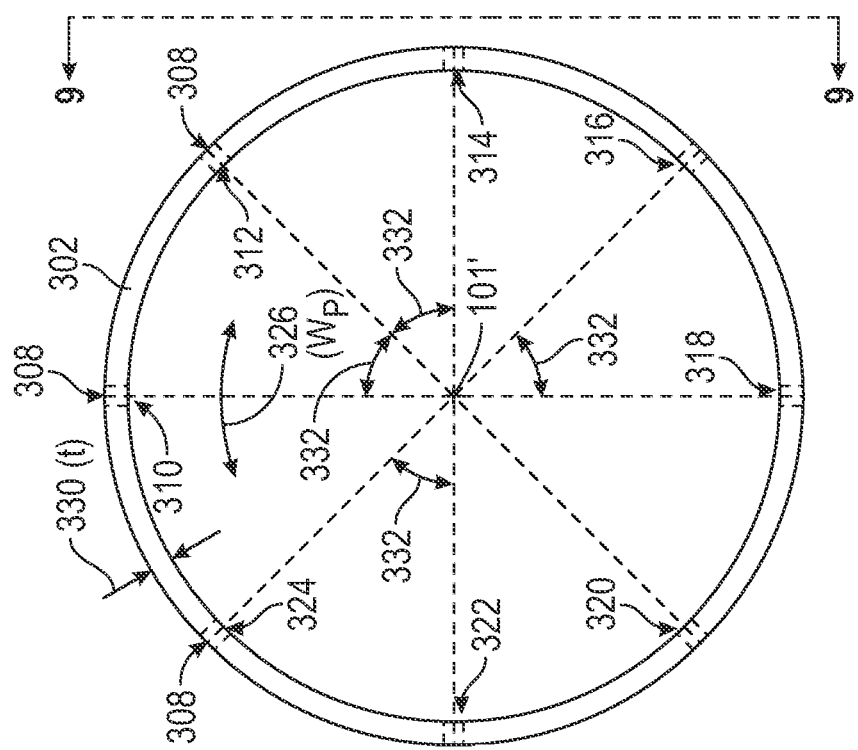
FIG. 8
FIG. 9A
FIG. 9B

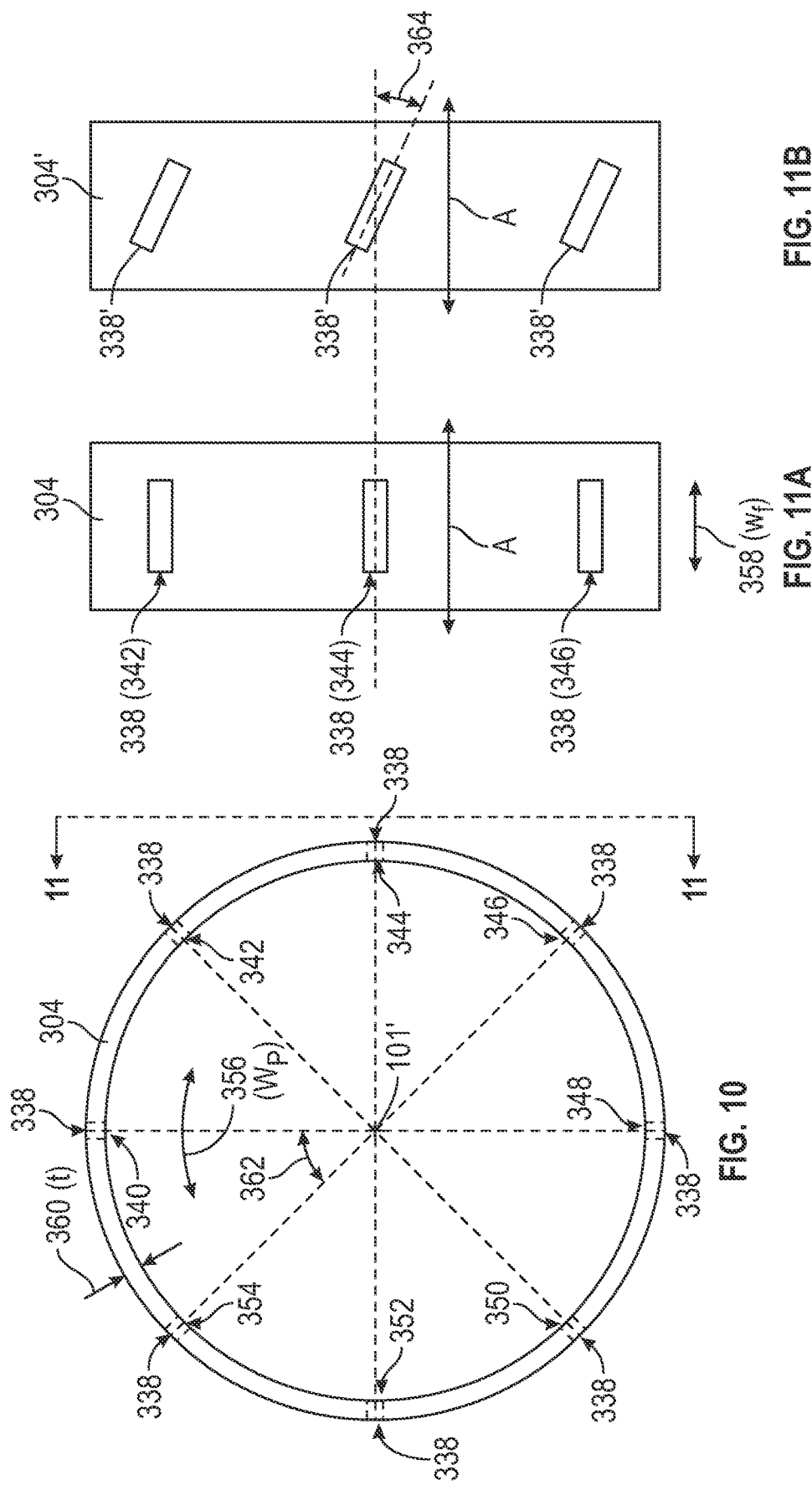

COMPOSITE STRUCTURE FOR A TURBINE ENGINE

GOVERNMENT INTEREST

This invention was made with United States Government support. The United States Government may have certain rights in the invention.

TECHNICAL FIELD

The present disclosure relates to composite components and methods of forming the composite components, particularly, composite components for aircraft engines.

BACKGROUND

Turbine engines used in aircraft generally include a fan and a turbo-engine section arranged in flow communication with one another. A combustor is arranged in the turbo-engine to generate combustion gases for driving a turbine in the turbo-engine of the turbine engine, and the turbine may be used to drive the fan. A portion of air flowing into the fan flows through the turbo-engine as core air, and another portion of the air flowing into the fan bypasses the core section and flows through the turbine engine as bypass air. The turbo-engine section may include one or more compressors to compress the core air before the core air flows into the combustor. Composite materials may be used to manufacture various components of the turbine engine, particularly, when the turbine engine is a turbine engine for an aircraft.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

FIG. 8 is a schematic aft-looking layout of the outer shell hoop preform of FIG. 7, according to an aspect of the present disclosure.

FIG. 9A is a schematic side view of the outer shell hoop preform from view 9-9 of FIG. 8, according to an aspect of the present disclosure.

FIG. 9B depicts an alternate arrangement to that shown in FIG. 9A, according to an aspect of the present disclosure.

FIG. 10 is a schematic aft-looking layout of the inner hub hoop preform of FIG. 7, according to an aspect of the present disclosure.

FIG. 11A is a schematic side view of the inner hub hoop preform from view 11-11 of FIG. 8, according to an aspect of the present disclosure.

FIG. 11B depicts an alternate arrangement to that shown in FIG. 11A, according to an aspect of the present disclosure.

DETAILED DESCRIPTION

Figure 1:
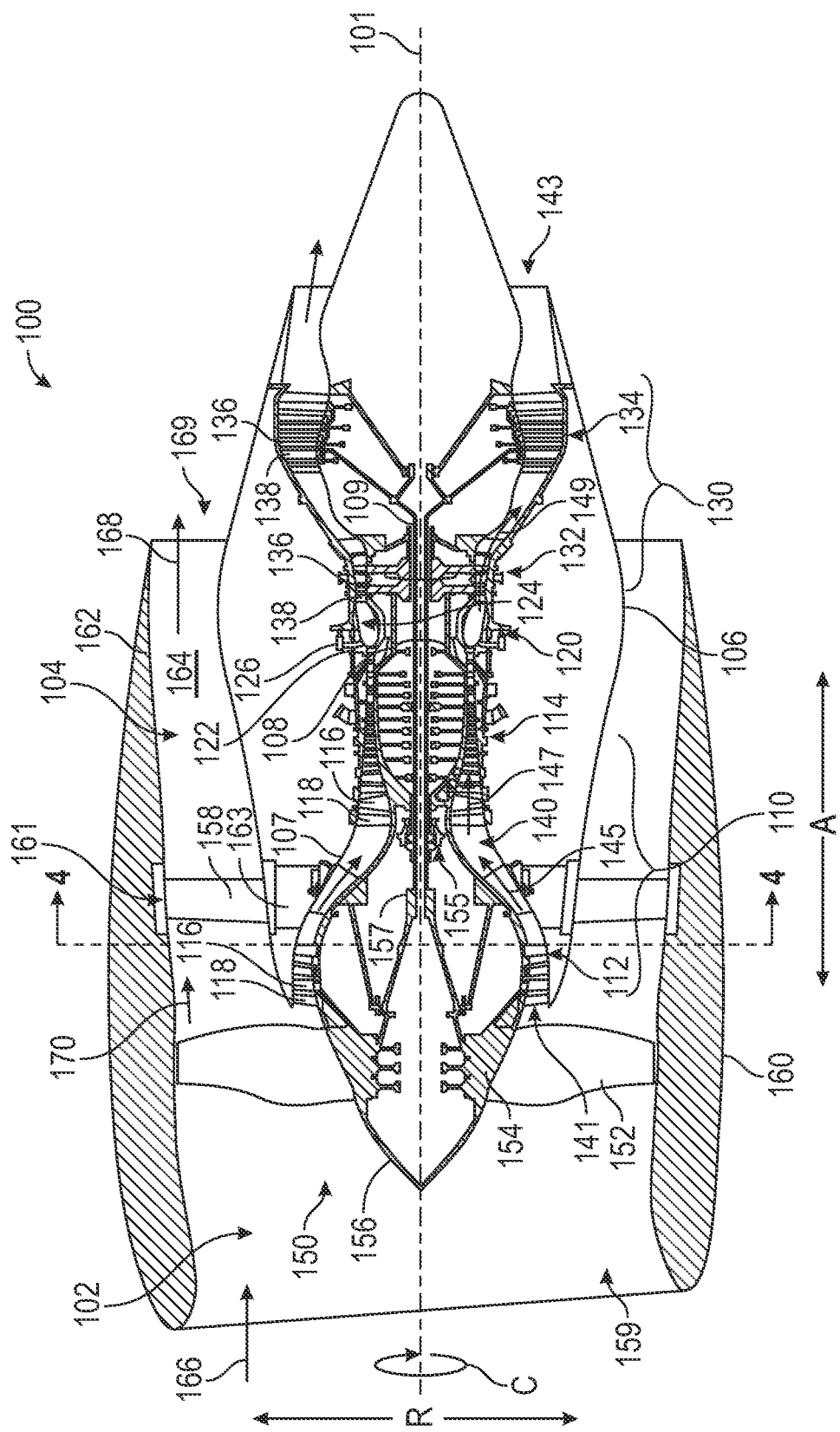
FIG. 1 is a schematic, cross-sectional view of a turbine engine of for an aircraft.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the present disclosure.

As used herein, the terms "first," "second," "third," and the like, may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially" is not to be limited to the precise value specified. In at least some instances, the approximating language may correspond to the precision of an instrument for measuring the value, or the precision of the methods or the machines for constructing or manufacturing the components and/or systems. For example, the approximating language may refer to being within a one, two, four, ten, fifteen, or twenty percent margin in either individual values, range(s) of values, and/or endpoints defining range(s) of values.

The terms "vane" and "strut" may be used interchangeably herein, and generally refer to a structural component implemented to provide structural support between two circular (or cylindrical) elements of a gas turbine engine, and/or to redirect a flow of air passing through two circular (or cylindrical) elements.

Here and throughout the specification and claims, range limitations are combined and interchanged. Such ranges are identified and include all the sub-ranges contained therein unless context or language indicates otherwise. For example, all ranges disclosed herein are inclusive of the endpoints, and the endpoints are independently combinable with each other.

The term "composite," as used herein, is indicative of a material having two or more constituent materials. A composite can be a combination of at least two or more metallic, non-metallic, or a combination of metallic and non-metallic elements or materials. Examples of a composite material can be, but not limited to, a polymer matrix composite (PMC), a ceramic matrix composite (CMC), a metal matrix composite (MMC). The composite may be formed of a matrix material and a reinforcing element, such as a fiber (referred to herein as a reinforcing fiber).

As used herein "reinforcing fibers" may include, for example glass fibers, carbon fibers, steel fibers, or para-aramid fibers, such as Kevlar® available from DuPont of Wilmington, Delaware. The reinforcing fibers may be in the form of fiber tows that include a plurality of fibers that are formed into a bundle.

"Preform" as used herein is a piece of three-dimensional woven fabric formed by a plurality of reinforcing fibers including warp fiber tows and weft fiber tows.

As used herein, a "composite component" refers to a structure or a component including any suitable composite material. Composite components, such as a composite airfoil, can include several layers or plies of composite material. The layers or plies can vary in stiffness, material, and dimension to achieve the desired composite component or composite portion of a component having a predetermined weight, size, stiffness, and strength.

One or more layers of adhesive can be used in forming or coupling composite components. Adhesives can include resin and phenolics, wherein the adhesive can require curing at elevated temperatures or other hardening techniques.

As used herein, PMC refers to a class of materials. The PMC material may be a prepreg. A prepreg is a reinforcement material (e.g., a reinforcing fiber) pre-impregnated with a polymer matrix material. Non-limiting examples of processes for producing polymeric prepregs include hot melt pre-pregging in which a molten resin is deposited onto the fiber reinforcement material and powder pre-pregging in which a resin is deposited onto the fiber reinforcement material, by way of a non-limiting example, electrostatically, and then adhered to the fiber, by way of a non-limiting example, in an oven or with the assistance of heated rollers.

Resins for matrix materials of PMCs can be generally classified as thermosets or thermoplastics. Thermoplastic resins are generally categorized as polymers that can be repeatedly softened and caused to flow when heated, and hardened when sufficiently cooled due to physical rather than chemical changes. Notable example classes of thermoplastic resins include nylons, thermoplastic polyesters, polyaryletherketones, and polycarbonate resins. Specific examples of high-performance thermoplastic resins that have been contemplated for use in aerospace applications include, polyetheretherketone (PEEK), polyetherketoneketone (PEKK), polyetherimide (PEI), polyaryletherketone (PAEK), and polyphenylene sulfide (PPS). In contrast, once fully cured into a hard rigid solid, thermoset resins do not undergo significant softening when heated, but instead thermally decompose when sufficiently heated. Notable examples of thermoset resins include epoxy, bismaleimide (BMI), and polyimide resins.

Instead of using a prepreg with thermoplastic polymers, another non-limiting example utilizes a woven fabric. Woven fabrics can include, but are not limited to, dry carbon fibers woven together with thermoplastic polymer fibers or filaments. Non-prepreg braided architectures can be made in a similar fashion. With this approach, it is possible to tailor the fiber volume of the part by dictating the relative concentrations of the thermoplastic fibers and the reinforcement fibers that have been woven or braided together. Additionally, different types of reinforcement fibers can be braided or woven together in various concentrations to tailor the properties of the part. For example, glass fibers, carbon fibers, and thermoplastic fibers could all be woven together in various concentrations to tailor the properties of the part. The carbon fibers provide the strength of the system, the glass fibers can be incorporated to enhance the impact properties, which is a design characteristic for parts located near the inlet of the engine, and the thermoplastic fibers provide the binding for the reinforcement fibers.

In yet another non-limiting example, resin transfer molding (RTM) can be used to form at least a portion of a composite component. Generally, RTM includes the application of dry fibers to a mold or a cavity. The dry fibers can include prepreg, braided material, woven material, or any combination thereof. Resin can be pumped into or otherwise provided to the mold or the cavity to impregnate the dry fibers. The combination of the impregnated fibers and the resin is then cured and removed from the mold. When removed from the mold, the composite component can require post-curing processing. RTM may be a vacuum assisted process. That is, air from the cavity or the mold can be removed and replaced by the resin prior to heating or curing. The placement of the dry fibers also can be manual or automated. The dry fibers can be contoured to shape the composite component or to direct the resin. Optionally, additional layers or reinforcing layers of a material differing from the dry fiber can also be included or added prior to heating or curing.

As used herein, CMC refers to a class of materials with reinforcing fibers in a ceramic matrix. Generally, the reinforcing fibers provide structural integrity to the ceramic matrix. Some examples of reinforcing fibers can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Some examples of ceramic matrix materials can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) can also be included within the ceramic matrix.

Generally, particular CMCs can be referred to by their combination of type of fiber/type of matrix. For example, C/SiC for carbon-fiber-reinforced silicon carbide, SiC/SiC for silicon carbide-fiber-reinforced silicon carbide, SiC/SiN for silicon carbide fiber-reinforced silicon nitride, SiC/SiC—SiN for silicon carbide fiber-reinforced silicon carbide/silicon nitride matrix mixture, etc. In other examples, the CMCs can be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain non-limiting examples, the reinforcing fibers may be bundled (e.g., form fiber tows) and/or coated prior to inclusion within the matrix. The bundles of fibers may be impregnated with a slurry composition prior to forming the preform or after formation of the preform. The preform may then undergo thermal processing, and subsequent chemical processing to arrive at a component formed of a CMC material having a desired chemical composition. For example, the preform may undergo a cure or a burn-out to yield a high char residue in the preform, and subsequent melt-infiltration with silicon, or a cure or a pyrolysis to yield a silicon carbide matrix in the preform, and subsequent chemical vapor infiltration with silicon carbide. Additional steps may be taken to improve densification of the preform, either before or after chemical vapor infiltration, by injecting the preform with a liquid resin or a polymer followed by a thermal processing step to fill the voids with silicon carbide. CMC material as used herein may be formed using any known or hereafter developed methods including but not limited to melt infiltration, chemical vapor infiltration, polymer impregnation pyrolysis (PIP), or any combination thereof.

The term "metallic" as used herein is indicative of a material that includes metal such as, but not limited to, titanium, iron, aluminum, stainless steel, and nickel alloys. A metallic material or an alloy can be a combination of at least two or more elements or materials, where at least one is a metal.

Traditional two-dimensional (2D) layup designs typically used for forming composite gas turbine engine components are challenging to manufacture and may have limited interlaminar strength. Specifically, composite components for gas turbine engines are generally constructed with hand laid plies or by combining multiple woven or prefabricated preforms into one molded part. Hand layup or assembly of preforms increases the labor and costs required to build the component. Assembly of preforms also comes with assembly and positioning challenges. Moreover, a composite component formed from 2D plies or multiple preforms will be more likely to have limited interlaminar loading capability.

The composite materials discussed herein may be particularly suitable for use in turbine engines for aircraft. FIG. 1 is a schematic, cross-sectional view a turbine engine 100 that may be used on an aircraft. The turbine engine 100 has an axial direction A (extending parallel to a longitudinal centerline axis 101, shown for reference in FIG. 2), a radial direction R, and a circumferential direction. C. The circumferential direction C extends in a direction rotating about the longitudinal centerline axis 101 (the axial direction A). In the embodiment depicted in FIG. 1, the turbine engine 100 is a high bypass turbofan engine, including a fan section 102 and a turbo-engine 104 disposed downstream from the fan section 102.

The turbo-engine 104 depicted in FIG. 1 includes a tubular outer casing 106 that defines a core inlet 141. In this embodiment, the core inlet 141 is annular about the longitudinal centerline axis 101. The outer casing 106 encases the turbo-engine 104, and the turbo-engine 104 includes, in a serial flow relationship, a compressor section 110 including a booster or a low-pressure (LP) compressor 112 and a high-pressure (HP) compressor 114, a combustion section 120, and a turbine section 130 including a high-pressure (HP) turbine 132 and a low-pressure (LP) turbine 134, and a core air exhaust nozzle 143. The compressor section 110, the combustion section 120, the turbine section 130, and the core air exhaust nozzle 143 together define, at least in part, a core air flow path 140 extending from the core inlet 141 to the core air exhaust nozzle 143, and through which core air 145 flows.

Each of the LP compressor 112 and the HP compressor 114 may include a plurality of compressor stages. In each stage, a plurality of compressor blades 116 rotate relative to a corresponding plurality of static compressor vanes 118 to compress or to pressurize the core air 145 passing through the stage. In a single compressor stage, a plurality of compressor blades 116 can be provided in a ring, extending radially outwardly relative to the longitudinal centerline axis 101 from a blade platform to a blade tip (e.g., extend in the radial direction R). The compressor blades 116 may be a part of a compressor rotor that includes a disk and the plurality of compressor blades 116 extend radially from the disk. Other configurations of the compressor rotor may be used, including, for example, blisks where the disk and the compressor blades 116 are integrally formed with each other to be a single piece. The corresponding static compressor vanes 118 are positioned upstream of and adjacent to the rotating compressor blades 116. The compressor vanes 118 for a stage of the compressor can be mounted to a core casing 107 in a circumferential arrangement. The core casing 107 may define, at least in part, the core air flow path 140. Each compressor stage may be used to sequentially compress the core air 145 flowing through the core air flow path 140, generating compressed air 147. Any suitable number of compressor blades 116, compressor vanes 118, and compressor stages may be used.

Each of the HP turbine 132 and the LP turbine 134 also may include a plurality of turbine stages. In each stage, a set of turbine blades 136 rotate relative to a corresponding set of static turbine vanes 138 to extract energy from combustion gases 149 passing through the stage. The turbine blades 136 may be a part of a turbine rotor. Any suitable configuration for a turbine rotor may be used, including, for example, a disk with the plurality of turbine blades 136 extending from the disk. The corresponding static turbine vanes 138 are positioned upstream of and adjacent to the rotating turbine blades 136. The turbine vanes 138 for a stage of the turbine can be mounted to the core casing 107 in a circumferential arrangement.

In the combustion section 120, fuel, received from a fuel system (not shown), is injected into a combustion chamber 124 of a combustor 122 by fuel nozzles 126. The fuel is mixed with the compressed air 147 from the compressor section 110 to form a fuel and air mixture, which is ignited and burned in the combustor 122, generating combustion products (i.e., combustion gases 149) within the combustor 122. The combustion gases are discharged from the combustion chamber 124 to the turbine section 130. The combustion gases 149 may be directed into the turbine blades 136 of the HP turbine 132 and, then, the turbine blades 136 of the LP turbine 134, and the combustion gases 149 drive (rotate) the turbine blades 136 of the HP turbine 132 and the LP turbine 134. Any suitable number of turbine blades 136, turbine vanes 138, and turbine stages may be used. After flowing through the turbine section 130, the combustion gases 149 are exhausted from the turbine engine 100 through the core air exhaust nozzle 143 to provide propulsive thrust.

The turbine engine 100 and, more specifically, the turbo-engine 104 further includes one or more drive shafts. More specifically, the turbo-engine 104 includes a high-pressure (HP) shaft 108 drivingly connecting the HP turbine 132 to the HP compressor 114, and a low-pressure (LP) shaft 109 drivingly connecting the LP turbine 134 to the LP compressor 112. The HP shaft 108 and the LP shaft 109 may also be referred to as spools. More specifically, the HP turbine rotors of the HP turbine 132 are connected to the HP shaft 108, and the HP compressor rotors of the HP compressor 114 are connected to the HP shaft 108. When the HP turbine blades 136 and, thus, the HP turbine rotors of the HP turbine 132 are rotated by the combustion gases 149 flowing through the core air flow path 140, the HP turbine rotors of the HP turbine 132 rotate the HP compressor rotors and, thus, the HP compressor blades 116 of the HP compressor 114 via the HP shaft 108. Similarly, the LP turbine rotors of the LP turbine 134 are connected to the LP shaft 109, and the LP compressor rotors of the LP compressor 112 are connected to the LP shaft 109. When the LP turbine rotors and, thus, LP the turbine blades 136 of the LP turbine 134 are rotated by the combustion gases 149 flowing through the core air flow path 140, the LP turbine rotors of the LP turbine 134 rotate the LP compressor rotors and, thus, the LP compressor blades 116 of the LP compressor 112 via the LP shaft 109. The HP shaft 108 and the LP shaft 109 are disposed coaxially about the longitudinal centerline axis 101. The HP shaft 108 has a greater diameter than that of the LP shaft 109, and the HP shaft 108 is located radially outward of the LP shaft 109. The HP shaft 108 and the LP shaft 109 are rotatable about the longitudinal centerline axis 101 and, as discussed above, coupled to rotatable elements such as the HP/LP compressor rotors and the HP/LP turbine rotors.

The fan section 102 shown in FIG. 1 includes a fan 150 having a plurality of fan blades 152 coupled to a disk 154. The fan blades 152 and the disk 154 are connected to a fan shaft 157, which is connected to a reduction gearbox 155 that is connected with and driven by the LP shaft 109. Thus, the fan blades 152 and the disk 154 are rotatable, together, about the longitudinal centerline axis 101 and are driven by rotation of the LP shaft 109. The disk 154 is covered by a rotatable fan hub 156 that is aerodynamically contoured to promote an airflow through the plurality of fan blades 152. Further, a nacelle 160 circumferentially surrounds the fan 150 and/or at least a portion of the turbo-engine 104. The nacelle 160 may also be referred to as an annular fan casing or an outer nacelle. The nacelle 160 is supported relative to the turbo-engine 104 by a plurality of circumferentially spaced vanes (or struts) 158 (two shown in FIG. 1) that are part of a vane structure 161 that is connected to an intermediate frame structure 163. The vane structure 161 will be described in more detail below, and the vane structure 161 may be one example of a composite component 161' that may be implemented in the gas turbine engine 100. A downstream section 162 of the nacelle 160 extends over an outer portion of the turbo-engine 104 and, more specifically, a downstream portion of the outer casing 106 so as to define a bypass airflow passage 164 therebetween.

During operation of the turbine engine 100, a volume of air 166 enters the turbine engine 100 through an inlet 159 of the nacelle 160 and/or the fan section 102. As the volume of air 166 passes across the fan blades 152, a first portion of the air 166 is propelled by the fan blades 152 to generate a swirled fan airflow 170 that is directed or routed toward the vanes 158, where the swirled fan airflow 170 may be redirected by the vanes 158 to an axial flow in the axial direction A and into the bypass airflow passage 164 as bypass air 168. A second portion of air 166 (shown schematically as core air 145) is directed or is routed into the core inlet 141 to an upstream section of the core air flow path 140. Simultaneously, with the flow of the core air 145 through the core air flow path 140 (as discussed above), the bypass air 168 is routed through the bypass airflow passage 164 before being exhausted from a bypass air discharge nozzle 169 of the turbine engine 100, also providing propulsive thrust.

The turbine engine 100 shown in FIG. 1 and discussed herein (turbofan engine) is provided by way of example only. In other embodiments, any other suitable engine may be utilized with aspects of the present disclosure. For example, in other embodiments, the engine may be any other suitable gas turbine engine, such as a turboshaft engine, a turboprop engine, a turbojet engine, an unducted single fan engine, and the like. In such a manner, in other embodiments, the gas turbine engine may have other suitable configurations, such as other suitable numbers or arrangements of shafts, compressors, turbines, fans, etc. Further, although the turbine engine 100 is shown as a direct drive, fixed-pitch turbofan engine, in other embodiments, the turbine engine 100 may be a geared turbine engine (e.g., including a gearbox between the fan 150 and a shaft driving the fan, such as the LP shaft 109), may be a variable pitch turbine engine (i.e., including a fan 150 having a plurality of fan blades 152 rotatable about their respective pitch axes), etc. Further, still, in alternative embodiments, aspects of the present disclosure may be incorporated into, or otherwise utilized with, any other type of engine, such as reciprocating engines.

The turbine engine 100 discussed herein is suitable for use on an aircraft. Suitable aircraft include, for example, an airplane, a helicopter, and an unmanned aerial vehicle (UAV). In other embodiments, the turbine engine may be any other turbine engine, such as an industrial turbine engine incorporated into a power generation system, or a nautical turbine engine on a ship or other vessel.

Various components of the turbine engine 100 may be formed from composite materials. These components are referred to herein as composite components. The fan blades 152, a fan casing having the vanes 158, compressor blades 116, and compressor vanes 118 may be made from PMC materials, for example. Other composites, such as CMC materials, may be used for other components, including, for example, turbine blades 136, turbine vanes 138, and components of the combustion section 120 such as combustor liners used to form the combustion chamber 124. Moreover, although the embodiments are described relative to a turbine engine 100, the composite component and methods of manufacturing may be used to form composite components used in applications beyond turbine engines.

Figure 2A:
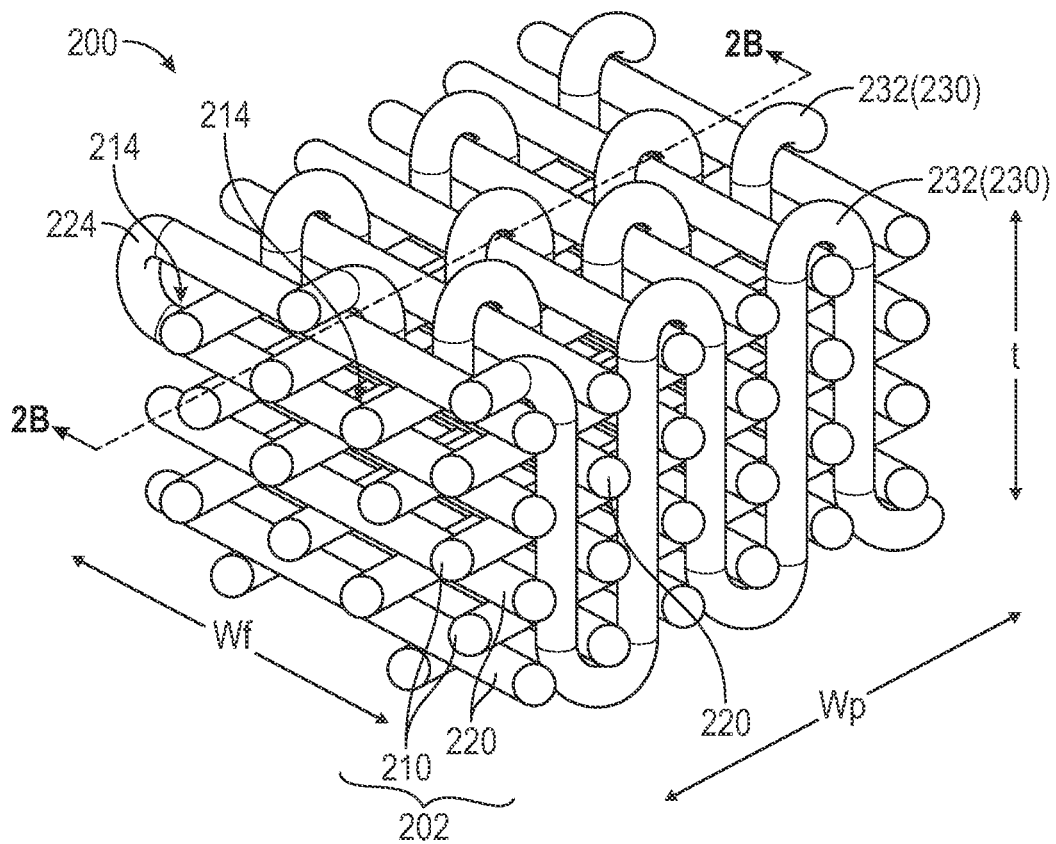
FIG. 2A is a schematic view of a three-dimensional fiber weave pattern, according to an aspect of the present disclosure.
Figure 2B:
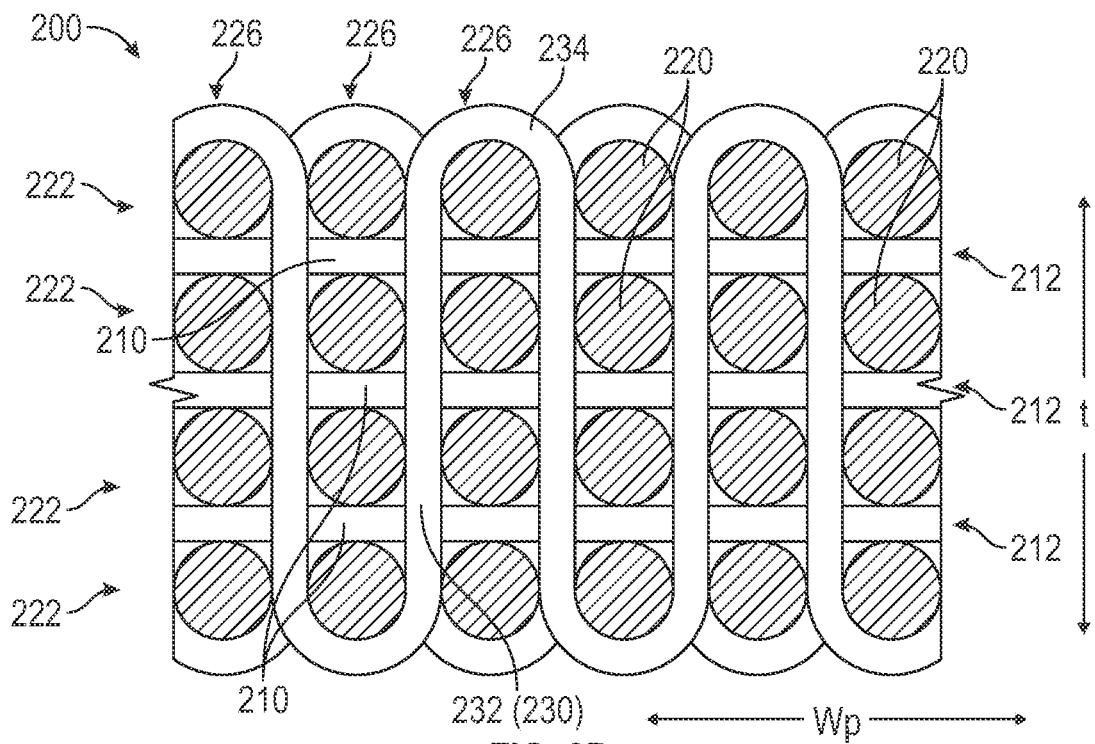
FIG. 2B is a schematic, cross-sectional view of the fiber weave pattern shown in FIG. 2A taken along line 2B-2B in FIG. 2A, according to an aspect of the present disclosure.

FIG. 2A is a schematic view showing an exemplary three-dimensional fiber weave pattern that may be used to form a woven fabric 200. FIG. 2B is a schematic, cross-sectional view taken along plane 2B-2B in FIG. 2A. In embodiments discussed herein, the composite components may be formed from a plurality of reinforcing fibers and, more specifically, a plurality of reinforcing fiber tows 202. The plurality of reinforcing fiber tows 202 are woven together in a three-dimensional pattern to form the woven fabric 200. The plurality of reinforcing fiber tows 202 include a plurality of first fiber tows, which, in this embodiment, is a plurality of warp fiber tows 210. The plurality of reinforcing fiber tows 202 also include a plurality of second fiber tows, which, in this embodiment, is a plurality of weft fiber tows 220. The weft fiber tows 220 or oriented transversely to the warp fiber tows 210, and, in the depicted embodiment, the warp fiber tows 210 and the weft fiber tows 220 are oriented generally orthogonally to each other. The woven fabric 200 thus includes a warp direction Wp (also referred to as a first direction) and a weft direction Wf (also referred to as a second direction). The warp fiber tows 210 extend in the warp direction Wp and the weft fiber tows 220 extend in the weft direction Wf.

In the depicted embodiment, the woven fabric 200 is a three-dimensional woven fabric and the woven fabric 200 also includes a thickness direction t. The thickness direction may also be referred to as a z direction. The warp fiber tows 210 are arrayed in both the weft direction Wf and the thickness direction t. The warp fiber tows 210 may be parallel to each other in both the weft direction Wf and the thickness direction t, and the woven fabric 200 may include a plurality of warp fiber layers 212 in the thickness direction t and a plurality of warp fiber columns 214 in the weft direction Wf. Three warp fiber layers 212 are depicted in FIGS. 2A and 2B, but the woven fabric 200 may include any other numbers of warp fiber layers 212, including more than three warp fiber layers 212.

During a weaving process, the warp fiber tows 210 may be held in tension in the warp direction Wp, and one of the weft fiber tows 220 is passed or drawn therethrough. A shuttle (not shown) may be used to draw the one of the weft fiber tows 220 through the warp fiber tows 210. The shuttle may be passed through the warp fiber tows 210 in a first direction and then reversed to pass through the warp fiber tows 210 at a different height in a thickness direction t, thereby forming a plurality of weft fiber layers 222 in the thickness direction t. One of the weft fiber tows 220 may be continuous through at least a portion of the thickness of the woven fabric 200, and the one of the weft fiber tows 220 may include a portion extending in the thickness direction t, which may be referred to in some embodiments as a turnaround. This portion of the weft fiber tow thus may be referred to herein as a turnaround portion 224. The warp fiber tows 210 may be moved relative to each other to allow a space for the one of the weft fiber tows 220 to pass through the space. The warp fiber tows 210 may be moved relative to each other in different ways to create different patterns. In this way, weaving the woven fabric 200 includes positioning the warp fiber tows 210 (e.g., such that the warp fiber tows 210 are held stationary in tension), then laying the weft fiber tows 220 (e.g., such that the weft fiber tows 220 are drawn through and inserted over and under the corresponding warp fibers 210), and repeating this process until the woven fabric 200 is formed. The weft fiber tows 220 may be parallel to each other in both the warp direction Wp and the thickness direction t, and the woven fabric 200 may include the plurality of weft fiber layers 222 in the thickness direction t and a plurality of weft fiber columns 226 in the warp direction Wp.

The woven fabric 200 also includes a plurality of interlocking fiber tows 230 (also referred to as Z-weaver fiber tows). The interlocking fiber tows 230 are additional warp fiber tows that are directed through the thickness of the woven fabric 200 during weaving to stitch the reinforcing fiber tows 202 together. The interlocking fiber tows 230 are woven to extend between two or more of the weft fiber layers 222. Different fiber patterns may be used for the interlocking fiber tows 230. A first interlocking fiber pattern, shown in FIGS. 2A and 2B, is an orthogonal interlocking pattern and the interlocking fiber tows 230 are referred to herein as orthogonal interlocking fiber tows 232. In this pattern, the orthogonal interlocking fiber tows 232 extend substantially in a direction that is orthogonal to the warp direction Wp, which is the thickness direction t in the depicted embodiment. As with the weft fiber tows 220, the interlocking fiber tows 230 (e.g., the orthogonal interlocking fiber tows 232) may include a turnaround portion 234. In the depicted embodiment, the turnaround portion 234 of the orthogonal interlocking fiber tows 232 is positioned to form an alternating pattern between each warp fiber columns 214. In the depicted embodiment, the orthogonal interlocking fiber tows 232 extend through the thickness of the woven fabric 200 and may be referred to as through-thickness interlocking fiber tows, but other thicknesses may be used.

Figure 2C:
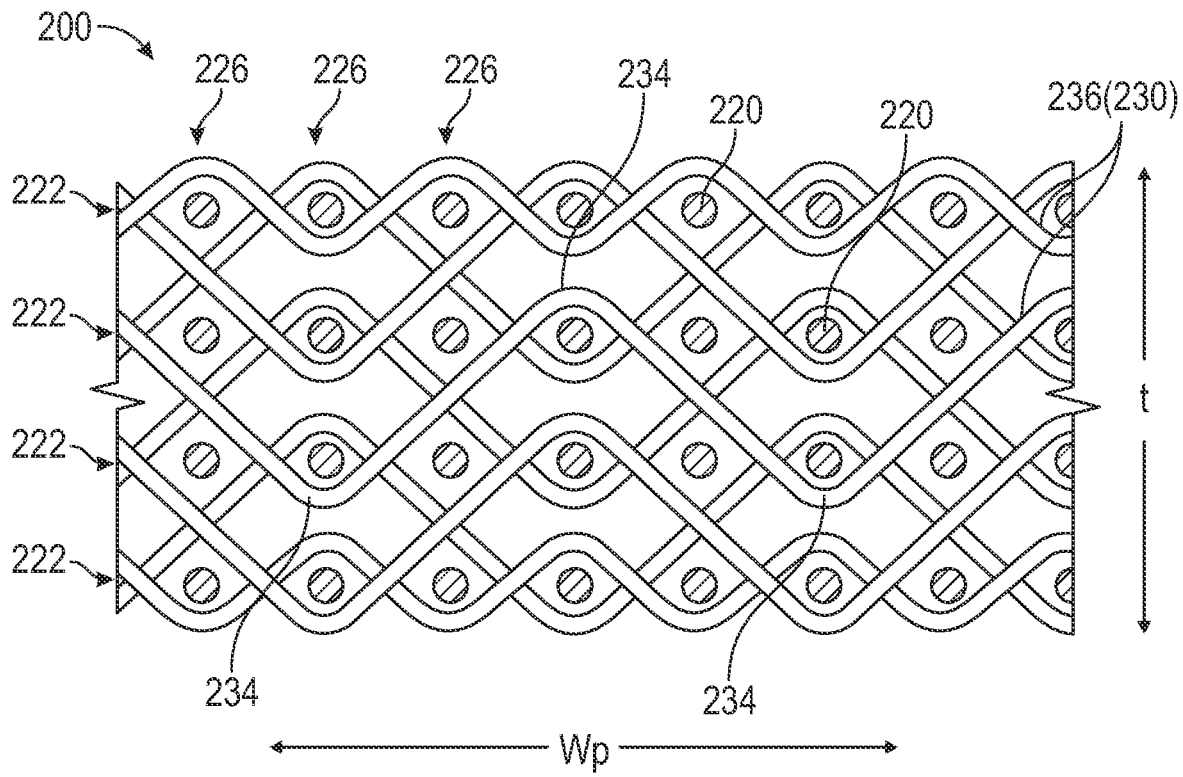
FIG. 2C is a schematic, cross-sectional view of a fiber weave pattern similar to the fiber weave pattern shown in FIG. 2A, but with a different interlocking fiber pattern, according to an aspect of the present disclosure.
Figure 2D:
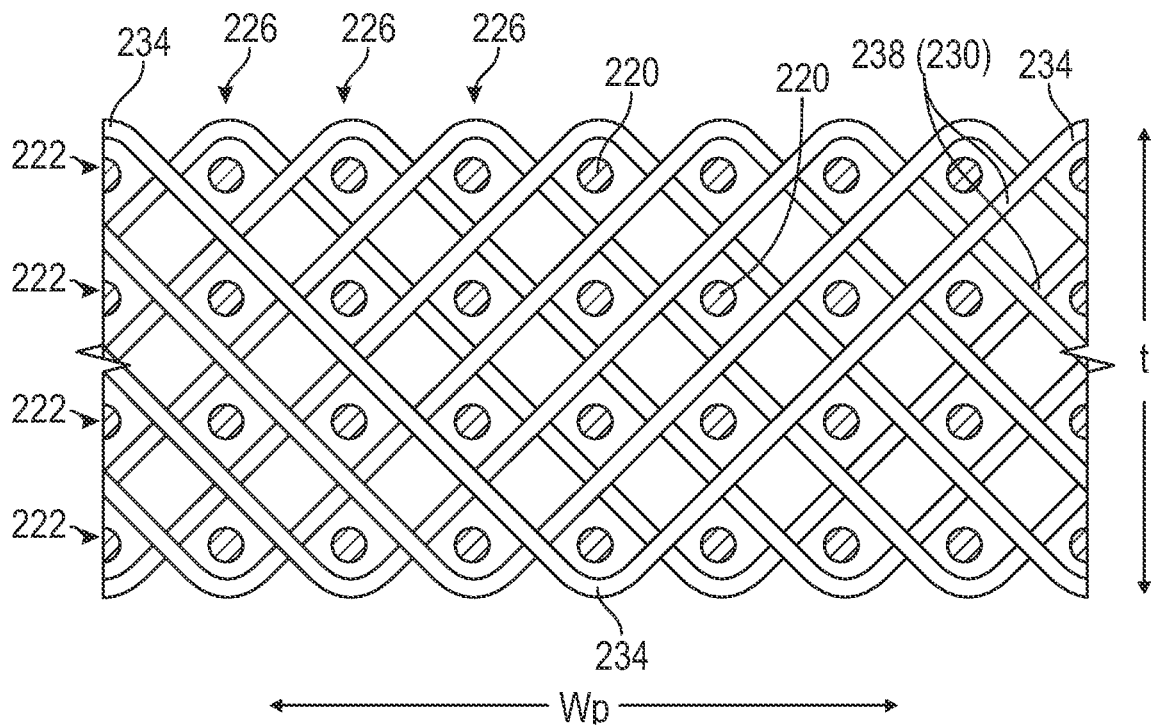
FIG. 2D is a schematic, cross-sectional view of a fiber weave pattern similar to the fiber weave pattern shown in FIG. 2A, but with another interlocking fiber pattern, according to an aspect of the present disclosure.

A second interlocking fiber pattern, shown in FIG. 2C, is an angle interlock pattern and, more specifically, a layer-to-layer angle interlock pattern. FIG. 2C is a cross-sectional view of a woven fabric taken from a perspective similar to FIG. 2B. The interlocking fiber tows 230 are referred to in this embodiment as angled interlocking fiber tows 236. Instead of extending orthogonally through the woven fabric 200, the angled interlocking fiber tows 236 form an oblique angle relative to the warp direction Wp. In the depicted embodiment, the angled interlocking fiber tows 236 extend through adjacent weft fiber layers 222 in an alternating or a sinusoidal pattern to interlock these adjacent layers with each other, with the oblique angle formed between adjacent turnaround portions 234 of the angled interlocking fiber tows 236. The turnaround portions 234 of the angled interlocking fiber tows 236 are located on every other weft fiber columns 226, but, in other embodiments, two or more weft fiber columns 226 may be between adjacent turnaround portions 234 of the angled interlocking fiber tows 236. In other embodiments, the angled interlocking fiber tows 236 may extend between more than two adjacent weft fiber layers 222. For example, as shown in FIG. 2D, the interlocking fiber tows 230 are through-thickness interlocking fiber tows, which are referred to herein as through-thickness angled interlocking fiber tows 238. FIG. 2D is a cross-sectional view of a woven fabric taken from a perspective similar to FIG. 2B. The weft fiber tows 220 are omitted in FIGS. 2C and 2D for clarity.

Figure 3:
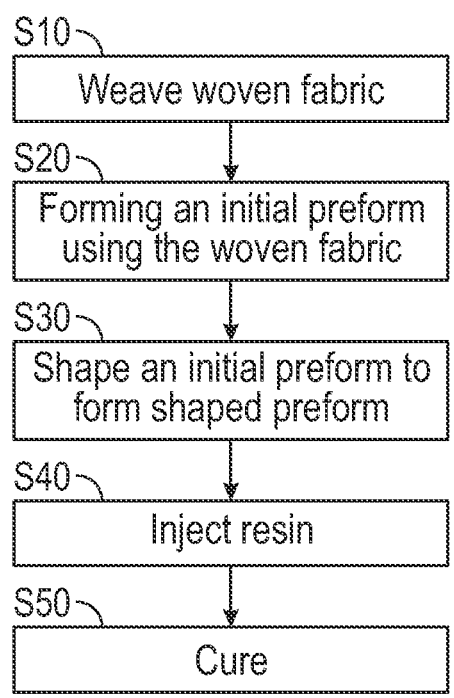
FIG. 3 is a flow chart of a general process of manufacturing a composite component that may be used in the turbine engine of FIG. 1, according to an aspect of the present disclosure.

FIG. 3 is a flow chart of a general process of manufacturing a composite component that may be used in the turbine engine of FIG. 1. The method includes, in step S10 weaving the woven fabric 200, such as on a loom. In step S20, the method includes forming an initial preform using one or more pieces of woven fabric 200. This step may include, for example, laying up a plurality of woven fabrics 200 or otherwise positioning the plurality of woven fabrics 200 relative to each other to form the initial preform. In step S30, the initial preform is shaped to form a shaped preform. Shaping the initial preform may include, for example, using a mold tool to shape the initial preform. Suitable shaping processes may include vacuum forming or other forming processes to impart a shape to the initial preform. The shaped preform may form a final preform, but optionally, additional machining processes and manufacturing processes, such as adding inserts, may be carried out on the shaped preform to form the final preform.

After the preform is complete (i.e., the final preform), a matrix material may be injected into the preform in step S40 to generate an infiltrated (or an impregnated) preform. When the composite component is a polymer matrix composite, polymers and/or a resin may be pumped into, injected into, or otherwise provided to a mold or a cavity to infiltrate or to impregnate the dry fibers in this step. This step may be done in conjunction with step S30 when using resin transfer molding (RTM) processes, for example. Other infiltration processes may be used in this step depending upon the matrix material. As noted above, the preform may be formed using prepreg fiber tows, and, in such an embodiment, this step (step S40) may be omitted.

The method continues with curing the infiltrated preform in step S50 to bond the composite material and, more specifically, the matrix together forming the composite component. The curing process depends upon the material and may include solidifying or otherwise hardening the matrix material around the fiber tows within the preform. For example, when the matrix material is a polymer, the curing may include both solidifying and chemically crosslinking the polymer chains. Curing the infiltrated preform can include several processes. For instance, an infiltrated preform may be debulked and cured by exposing the infiltrated preform to elevated temperatures and pressures in an autoclave. The infiltrated preform may also be subjected to one or more further processes, such as, e.g., a burn off cycle and a densification process. The curing step S50 may be done in conjunction with step S40, such as when the matrix material is injected into the final preform in a molten state and the curing step includes cooling the matrix material.

Further, the composite component may be finish machined as needed. Finish machining may define the final finished shape or contour of the composite component. For example, when the composite component is a fan blade 152 (FIG. 1), the edges of the fan blade 152 may be machined to define the final airfoil shape or the contour of the fan blade. Additionally, the composite component can be coated with one or more suitable coatings, such as, e.g., an environmental barrier coating (EBC) or a polyurethane surface coating.

Figure 4:
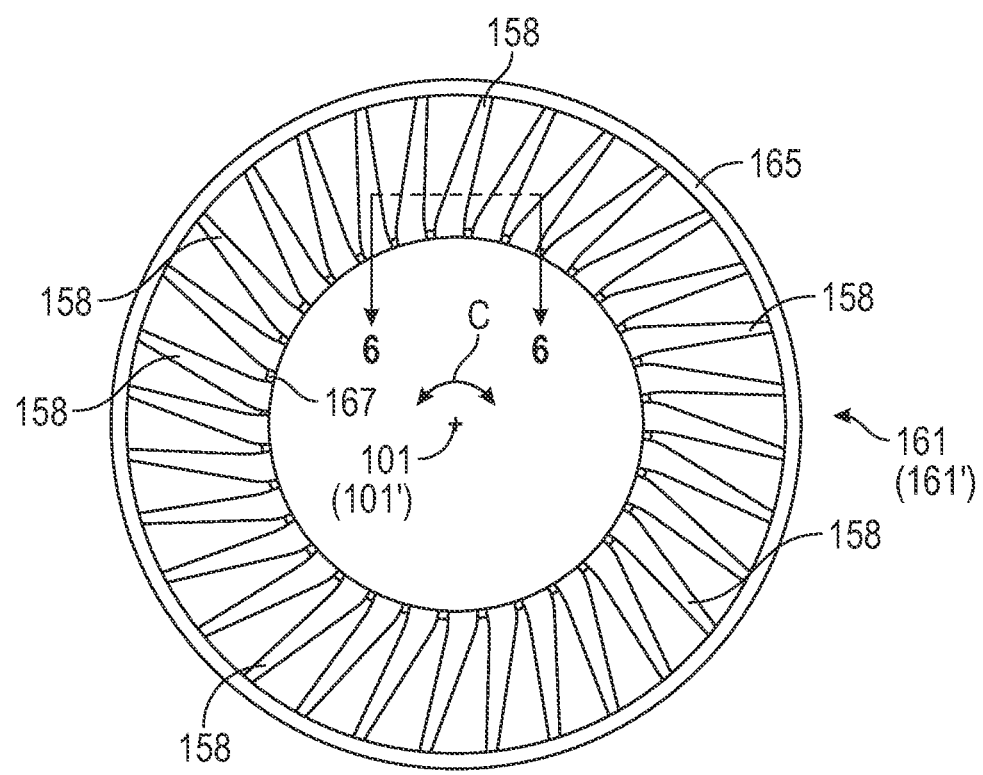
FIG. 4 is a schematic forward aft-looking view of a vane structure, taken at plane 4-4 of FIG. 1, according to an aspect of the present disclosure.
Figure 5:
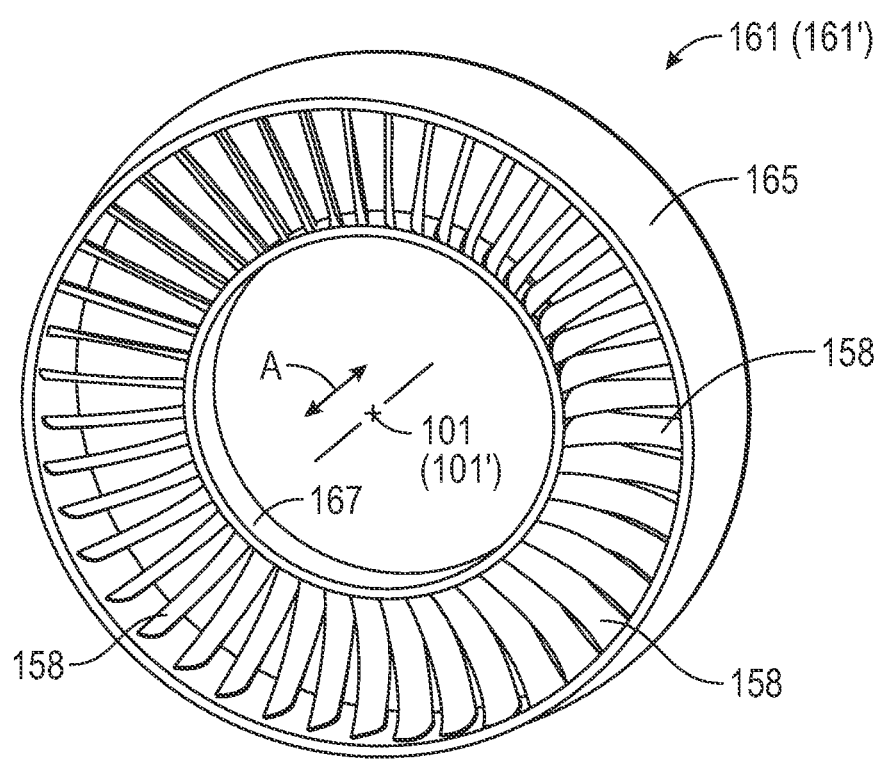
FIG. 5 is a schematic top aft-looking perspective view of the vane structure of FIG. 4, according to an aspect of the present disclosure.

FIG. 4 is a schematic forward aft-looking view of the vane structure 161, taken at plane 4-4 of FIG. 1, according to an aspect of the present disclosure. FIG. 5 is a schematic top aft-looking perspective view of the vane structure of FIG. 4, according to an aspect of the present disclosure. Referring collectively to FIG. 4 and FIG. 5, only the vane structure 161 is shown, with other elements of FIG. 1 (e.g., the nacelle 160 and the turbo-engine components within the outer casing 106) being omitted merely for clarity. In FIG. 4 and FIG. 5, the vane structure 161 may be an outlet guide vane structure arranged downstream of the fan 150 and that includes the vanes 158 of FIG. 1. However, the vane structure 161 is not limited to an outlet guide vane structure and, in other aspects, the vane structure 161 may be an inlet guide vane structure, or may be a stator vane structure that may be implemented in the compressor section 110 or in the turbine section 130 of the turbo-engine 104. As shown in FIG. 4, the vane structure 161 includes an outer shell 165 that extends circumferentially about a vane structure centerline axis 101', which is congruent to the longitudinal centerline axis 101 of the turbine engine 100, and also extends in the axial direction A (FIG. 1). The vane structure 161 also includes an inner hub 167 that extends circumferentially about the vane structure centerline axis 101' and that extends in the axial direction A. The plurality of vanes 158 extend between the outer shell 165 and the inner hub 167, and are circumferentially spaced apart from one another about the vane structure centerline axis 101' and connect the outer shell 165 and the inner hub 167 together. The vane structure 161 is an example of a composite component that may be implemented in the turbine engine 100 and a description of a composite vane structure and a method of manufacturing the composite vane structure will be described in more detail below.

Figure 6:
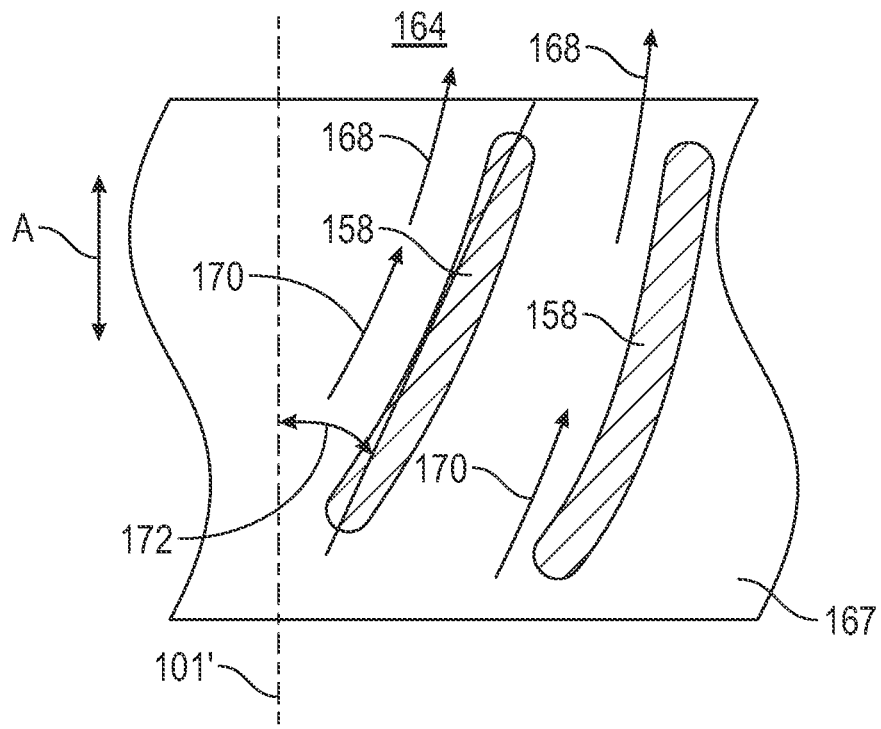
FIG. 6 is a cross-sectional view, taken at plane 6-6 of FIG. 4, through a vane of the vane structure, according to an aspect of the present disclosure.

FIG. 6 is a cross-sectional view, taken at plane 6-6 of FIG. 4, through a vane of the vane structure, according to an aspect of the present disclosure. As shown in FIG. 6, the vanes 158 may have an airfoil shape and may include camber so as to be a curved vane. In this manner, the vanes 158 can receive the swirled fan airflow 170 and redirect the swirled fan airflow 170 to be an axial airflow in the axial direction A and into the bypass airflow passage 164 as the bypass air 168. Each of the vanes 158 may be arranged at an angle 172 with respect to the centerline axis 101'.

Figure 7:
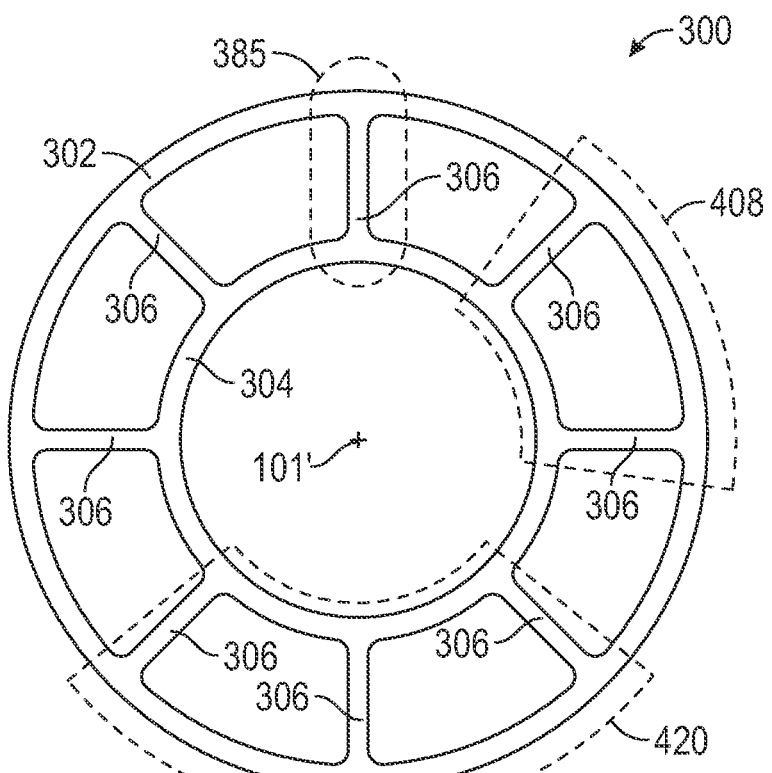
FIG. 7 is a schematic aft-looking layout of a preform assembly used in manufacturing a composite component, according to an aspect of the present disclosure.

FIG. 7 is a schematic aft-looking layout of a preform assembly 300 used in manufacturing a composite component, according to an aspect of the present disclosure. More particularly, the preform assembly 300 of FIG. 7 is configured for manufacturing a vane assembly, such as the vane structure 161 of FIG. 4 and FIG. 5. In FIG. 7, the preform assembly 300 includes an outer shell hoop preform 302, an inner hub hoop preform 304, and a plurality of strut preforms 306. As will be described in more detail below, the plurality of strut preforms 306 are circumferentially spaced apart and extend between, and connect, the outer shell hoop preform 302 with the inner hub hoop preform 304. FIG. 7 depicts eight strut preforms 306 extending between the outer shell hoop preform 302 and the inner hub hoop preform 304, and each strut preform 306 corresponds to a respective vane 158 (FIG. 4) of a vane structure 161 for which the preform assembly 300 is utilized in manufacturing the vane structure 161. While FIG. 4 and FIG. 5 depict more than eight vanes 158, the depiction of eight strut preforms 306 in FIG. 7 is merely for brevity and clarity of the following description, and in manufacturing the vane structure 161 of FIG. 4, the number of strut preforms 306 included in the preform assembly 300 would correspond to the number of vanes 158 included in the vane structure 161 of FIG. 4. As will be described below, the preform assembly 300 is assembled onto a mold tooling structure to manufacture the composite component utilizing the preform assembly 300.

FIG. 8 is a schematic aft-looking layout of the outer shell hoop preform of FIG. 7, according to an aspect of the present disclosure. FIG. 9A is a schematic side view of the outer shell hoop preform 302 from view 9-9 of FIG. 8. Referring collectively to FIG. 8 and FIG. 9A, the outer shell hoop preform 302 may be a three-dimensional woven fabric preform that may be woven in accordance with any of the three-dimensional woven structures of FIG. 2A to FIG. 2D. In weaving the three-dimensional woven fabric for the outer shell hoop preform 302, warp fiber tows (e.g., warp fiber tows 210 of FIG. 2A and FIG. 2B) are weaved to extend in a first direction, such as a hoop direction 326 (Wp), weft fiber tows (e.g., weft fiber tows 220 of FIG. 2A and FIG. 2B) are woven to extend in a second direction 328 orthogonal to the first direction (e.g., in the axial direction A), and interlocking fiber tows (e.g., interlocking fiber tows 230 of FIG. 2A and FIG. 2B) are woven in a third direction 330 (e.g., the thickness direction t). Alternatively, the outer shell hoop preform 302 may be constructed of a plurality of two-dimensional woven sheets that are layered together to form the thickness of the outer shell hoop preform 302. As another alternative, the outer shell hoop preform 302 may be formed with one of more braided tubular structures that may be flattened and layered so as to form the thickness of the outer shell hoop preform 302.

In FIG. 8 and FIG. 9A, the outer shell hoop preform 302 includes a plurality of outer shell strut slots 308 that are circumferentially spaced apart by an angular amount 332, and that extend through the thickness t of the outer shell hoop preform 302. The number of outer shell strut slots 308, and the circumferential spacing (angular amount 362) of the outer shell strut slots 308 correspond to the number and the spacing of the vanes to be formed in the composite component (e.g., the number and the spacing of the vanes 158 of the vane structure 161). In FIG. 8, eight outer shell strut slots 308 are shown, including a first outer shell strut slot 310, a second outer shell strut slot, 312, a third outer shell strut slot 314, a fourth outer shell strut slot 316, a fifth outer shell strut slot 318, a sixth outer shell strut slot 320, a seventh outer shell strut slot 322, and an eighth outer shell strut slot 324. Each of the outer shell strut slots 308 may be cut through the three-dimensional woven fabric of the outer shell hoop preform 302, or may be provided through the outer shell hoop preform 302 during the weaving process (i.e., may be woven into the outer shell hoop preform 302). As shown in FIG. 9A, each of the outer shell strut slots 308 may be cut (or weaved) as an axial slot extending in the axial direction A.

FIG. 9B depicts an alternate arrangement to that shown in FIG. 9A. In FIG. 9B, an alternate arrangement of an outer shell hoop preform 302' includes a plurality of outer shell strut slots 308'. The outer shell strut slots 308' are similar to the outer shell strut slots 308, but are shown to extend at an angle 334 with respect to the axial direction A. The angle 334 of the outer shell strut slots 308' may be the same as the angle 172 (FIG. 6) for an arrangement of the vanes 158 of FIG. 6.

FIG. 10 is a schematic aft-looking layout of the inner hub hoop preform 304 of FIG. 7, according to an aspect of the present disclosure. FIG. 11A is a schematic side view of the inner hub hoop preform 304 from view 11-11 of FIG. 8. Referring collectively to FIG. 10 and FIG. 11A, the inner hub hoop preform 304 may be a three-dimensional woven fabric preform that may be woven in accordance with any of the three-dimensional weaved structures of FIG. 2A to FIG. 2D. In weaving the three-dimensional woven fabric for the inner hub hoop preform 304, warp fiber tows (e.g., warp fiber tows 210 of FIG. 2A and FIG. 2B) are woven to extend in a first direction, such as a hoop direction 356 (Wp), weft fiber tows (e.g., weft fiber tows 220 of FIG. 2A and FIG. 2B) are woven to extend in a second direction 358 (Wf) orthogonal to the first direction (e.g., in the axial direction A), and interlocking fiber tows (e.g., interlocking fiber tows 230 of FIG. 2A and FIG. 2B) are woven in a third direction 360 (e.g., the thickness direction t). Alternatively, the inner hub hoop preform 304 may be constructed of a plurality of two-dimensional woven sheets that are layered together to form the thickness of the inner hub hoop preform 304. As another alternative, the inner hub hoop preform 304 may be formed with one of more braided tubular structures that may be flattened and layered so as to form the thickness of the inner hub hoop preform 304.

In FIG. 10 and FIG. 11A, the inner hub hoop preform 304 includes a plurality of inner hub strut slots 338 that are circumferentially spaced apart by an angular amount 362, and that extend through the thickness t of the inner hub hoop preform 304. The number of inner hub strut slots 338, and the circumferential spacing (angular amount 362) of the inner hub strut slots 338 corresponds to the number and the spacing of the outer shell strut slots 308 (FIG. 8) in the outer shell hoop preform 302 (FIG. 8). In FIG. 10, eight inner hub strut slots 338 are shown corresponding to the eight outer shell strut slots 308 (FIG. 8), including a first inner hub strut slot 340, a second inner hub strut slot, 342, a third inner hub strut slot 344, a fourth inner hub strut slot 346, a fifth inner hub strut slot 348, a sixth inner hub strut slot 350, a seventh inner hub strut slot 352, and an eighth inner hub strut slot 354. Each of the inner hub strut slots 338 may be cut through the three-dimensional woven fabric of the inner hub hoop preform 304, or may be provided through the inner hub hoop preform 304 during the weaving process (i.e., may be woven into the inner hub hoop preform 304). As shown in FIG. 11A, each of the inner hub strut slots 338 may be cut (or woven) as an axial slot extending in the axial direction A.

FIG. 11B depicts an alternate arrangement to that shown in FIG. 11A. In FIG. 11B, an alternate arrangement of an inner hub hoop preform 304' includes a plurality of inner hub strut slots 338'. The inner hub strut slots 338' are similar to the inner hub strut slots 338 (FIG. 11A), but are shown to extend at an angle 364 with respect to the axial direction A. The angle 364 of the inner hub strut slots 338' may be the same as the angle 334 of the outer shell strut slots 308' (FIG. 9B).

Figure 12:
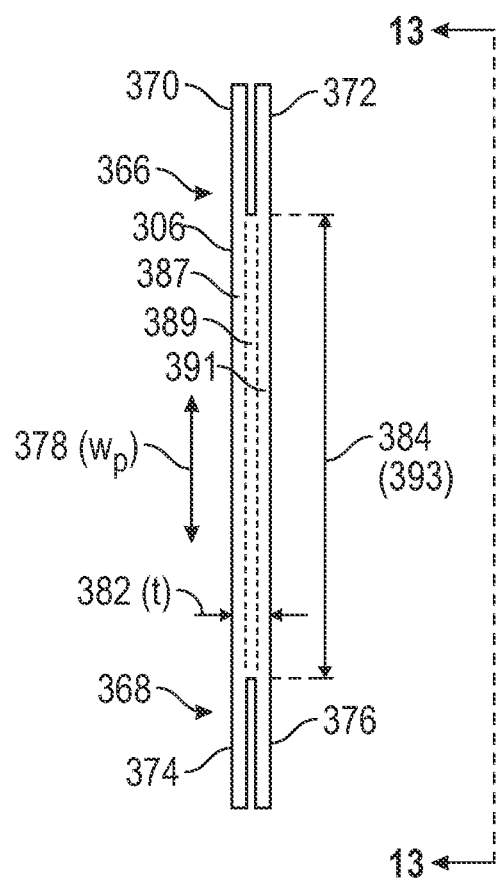
FIG. 12 is a schematic aft-looking view of a strut preform, according to an aspect of the present disclosure.
Figure 13:
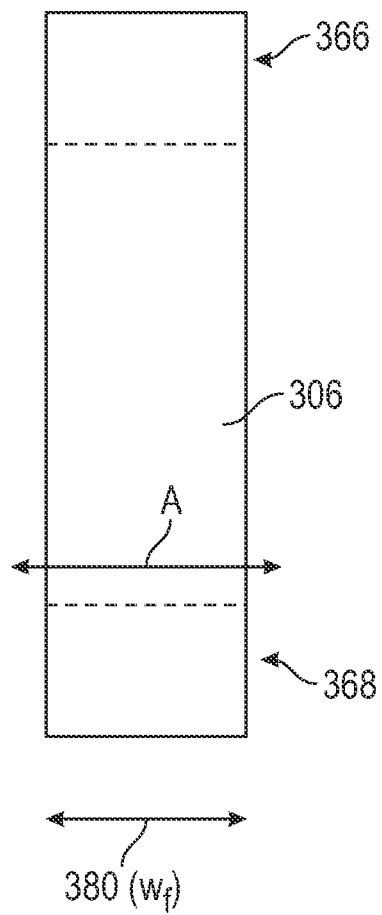
FIG. 13 is schematic side view of the strut preform of FIG. 12, taken at view 13-13 of FIG. 12, according to aspect of the present disclosure.

FIG. 12 is a schematic aft-looking view of a strut preform 306, according to an aspect of the present disclosure. FIG. 13 is schematic side view of the strut preform 306 at view 13-13 of FIG. 12. Referring collectively to FIG. 12 and FIG. 13, the strut preform 306 may be a three-dimensional woven fabric preform that may be weaved in accordance with any of the three-dimensional woven structures of FIG. 2A to FIG. 2D. In weaving the three-dimensional woven fabric for the strut preform 306, warp fiber tows (e.g., warp fiber tows 210 of FIG. 2A and FIG. 2B) are woven to extend in a first direction 378 (Wp), weft fiber tows (e.g., weft fiber tows 220 of FIG. 2A and FIG. 2B) are woven to extend in a second direction 380 (Wf) orthogonal to the first direction 378 (e.g., in the axial direction A), and interlocking fiber tows (e.g., interlocking fiber tows 230 of FIG. 2A and FIG. 2B) are woven in a third direction 382 (e.g., the thickness direction t).

The strut preform 306 is woven to include a first end 366 and a second end 368. The first end 366 includes a first bifurcated end portion 370 and a second bifurcated end portion 372. The second end 368 includes a third bifurcated end portion 374 and a fourth bifurcated end portion 376. As will be described in more detail below, the first bifurcated end portion 370 and the second bifurcated end portion 372 can be splayed (i.e., separated from one another in different directions), and the third bifurcated end portion 374 and the fourth bifurcated end portion 376 can also be splayed from one another. The strut preform 306 is woven to have a length 384 extending between the first end 366 and the second end 368, and the length 384 of the strut preform 306 can be based on whether the strut preform 306 is implemented for forming a single vane extending between the outer shell hoop preform 302 and the inner hub hoop preform 304, or is implemented for forming multiple vanes (to be described below).

Alternatively, rather than the strut preform 306 being woven as a three-dimensional woven fabric as described above, the strut preform 306 may be woven utilizing a plurality of layers of two-dimensional woven fabric preforms, or a plurality of layers of two-dimensional braided woven preforms. For example, as shown by dotted line, the strut preform 306 of FIG. 12 may be woven utilizing a first two-dimensional strut layer 387, a second two-dimensional strut layer 389, and a third two-dimensional strut layer 391 that may be stacked together to form the thickness (t) 382 of the strut preform 306. Each of the first two-dimensional strut layer 387, the second two-dimensional strut layer 389, and the third two-dimensional strut layer 391 may be either a single flat woven two-dimensional fabric layer, or may be a braided preform layer that may be woven as a braided tube that is then flattened to form two flattened layers on top of each other. Both the first two-dimensional strut layer 387 and the third two-dimensional strut layer 391 may have a longer length than the second two-dimensional strut layer 389 and the first two-dimensional strut layer 387, the second two-dimensional strut layer 389, and the third two-dimensional strut layer 391 may be layered together along the length 384, which may correspond to the length of the second two-dimensional strut layer 389 (i.e., a middle portion 393 of the strut preform 306), and the middle portion 393 may be stitched together. The longer length of the first two-dimensional strut layer 387 provides for the extra woven fabric extending beyond the middle portion to function the same as the first bifurcated end portion 370 and the third bifurcated end portion 374. Similarly, the longer length of the third two-dimensional strut layer 391 provides for the extra woven fabric extending beyond the middle portion to function the same as the second bifurcated end portion 372 and the fourth bifurcated end portion 376.

Various aspects for assembling the outer shell hoop preform 302, the inner hub hoop preform 304, and the plurality of strut preforms 306 to obtain the preform assembly 300 of FIG. 7 will now be described.

Figure 14:
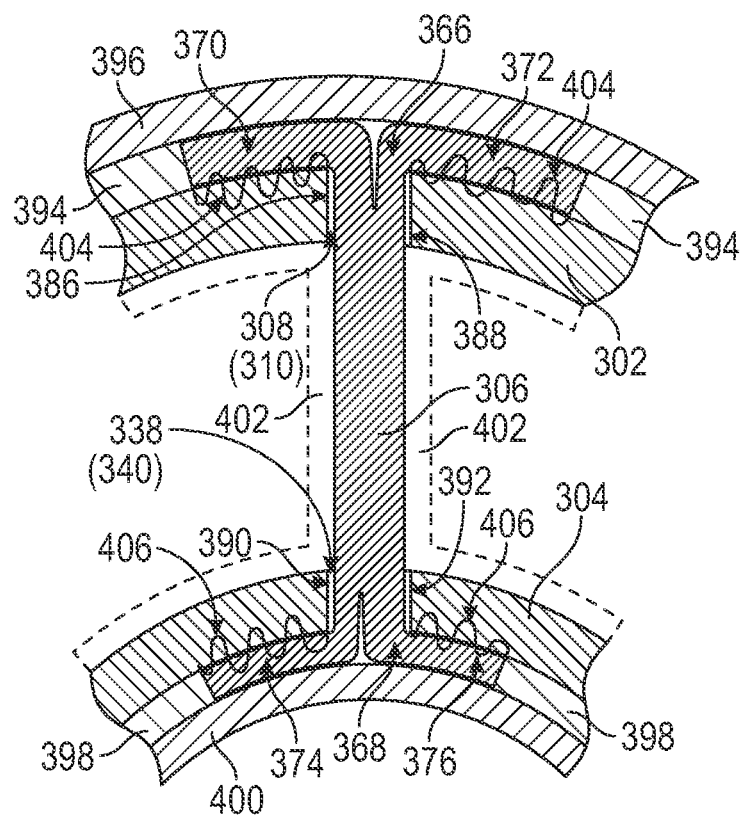
FIG. 14 is a detailed cross-sectional view of a portion of the preform assembly, taken at detail view 385 of FIG. 7, according to an aspect of the present disclosure.

FIG. 14 is a detailed cross-sectional view of a portion of the preform assembly 300 taken at detail view 385 of FIG. 7, according to an aspect of the present disclosure. In FIG. 14, the strut preform 306 is configured to form a single strut (vane). The first end 366 of the strut preform 306 is inserted through the outer shell strut slot 308 (the first outer shell strut slot 310 of FIG. 8) and the second end 368 of the strut preform 306 is inserted through the inner hub strut slot 338 (the first inner hub strut slot 340 of FIG. 10). The first end 366 is splayed and the first bifurcated end portion 370 is overlayed onto the outer shell hoop preform 302 on a first side 386 of the first outer shell strut slot 310, and the second bifurcated end portion 372 is overlayed onto the outer shell hoop preform 302 on a second side 388 of the first outer shell strut slot 310. Similarly, the second end 368 of the strut preform 306 is splayed and the third bifurcated end portion 374 is overlayed onto the inner hub hoop preform 304 on a first side 390 of the first inner hub strut slot 340, and the fourth bifurcated end portion 376 is overlayed onto the inner hub hoop preform 304 on a second side 392 of the first inner hub strut slot 340. Each of the first bifurcated end portion 370 and the second bifurcated end portion 372 may further be stitched to the outer shell hoop preform 302 via a stitching 404. Additionally, each of the third bifurcated end portion 374 and the fourth bifurcated end portion 376 may also be stitched to the inner hub hoop preform 304 via a stitching 406.

To further assemble the preform assembly 300 of FIG. 7, additional strut preforms 306 are inserted into respective ones of the remaining outer shell strut slots 308 and into respective ones of the remaining inner hub strut slots 338 in the same manner. To complete the preform assembly 300, additional preform support layers may be included to provide further structural support. For instance, a first additional preform support layer 394 and a second additional preform support layer 396 may be included on the outer shell hoop preform 302, and a third additional preform support layer 398 and a fourth additional preform support layer 400 may be included on the inner hub hoop preform 304. Further, one or more strut support layers 402 (shown in dashed lines) may be included on the strut preform 306 to provide additional structural support and/or vane shaping for the vanes. Any of the support layers may be three-dimensional woven fabric layers, or may be two-dimensional woven fabric layers. While not shown in FIG. 14, any one or more of the additional support layers may be stitched to each other, may be stitched to any of the bifurcated end portions, and/or may be stitched to the outer shell hoop preform or to the inner hub hoop preform.

Figure 15:
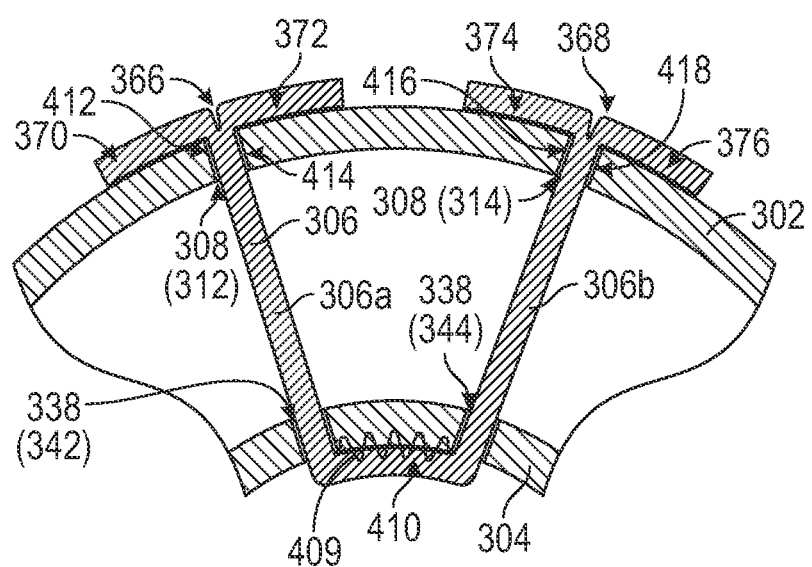
FIG. 15 is a detailed cross-sectional view of a portion of the preform assembly, taken at detail view 408 of FIG. 7, according to an aspect of the present disclosure.

FIG. 15 is a detailed cross-sectional view of a portion of the preform assembly 300 taken at detail view 408 of FIG. 7, according to an aspect of the present disclosure. In FIG. 15, the strut preform 306 is configured to form multiple struts (vanes), and, in particular, is shown to form two struts (vanes). To be capable of forming multiple struts, the length 384 (FIG. 12) of the strut preform is longer for the FIG. 15 aspect than that for the FIG. 14 aspect. In FIG. 15, the strut preform 306 is assembled to the outer shell hoop preform 302 and to the inner hub hoop preform 304 by inserting the second end 368 through the second outer shell strut slot 312, through the second inner hub strut slot 342, then through the third inner hub strut slot 344, and finally through the third outer shell strut slot 314. Thus, a middle portion 410 of the strut preform 306 extends across (overlays) the inner hub hoop preform 304 between the second inner hub strut slot 342 and the third inner hub strut slot 344, and the overlaying middle portion 410 of the strut preform 306 may be stitched to the inner hub hoop preform 304 with a stitching 409.

At the first end 366, the first bifurcated end portion 370 and the second bifurcated end portion 372 are splayed, with the first bifurcated end portion 370 being overlayed onto the outer shell hoop preform 302 on a first side 412 of the second outer shell strut slot 312, and the second bifurcated end portion 372 being overlayed onto the outer shell hoop preform 302 on a second side 414 of the second outer shell strut slot 312. Similarly, at the second end 368 of the strut preform 306, the third bifurcated end portion 374 and the fourth bifurcated end portion 376 are splayed, with the third bifurcated end portion 374 being overlayed onto the outer shell hoop preform 302 on a first side 416 of the third outer shell strut slot 314 and the fourth bifurcated end portion 376 being overlayed onto the outer shell hoop preform 302 on a second side 418 of the third outer shell strut slot 314. While not shown in FIG. 15, each of the first bifurcated end portion 370, the second bifurcated end portion 372, the third bifurcated end portion 374, and the fourth bifurcated end portion 376 may be stitched to the outer shell hoop preform 302 in the same manner as shown in FIG. 14. In addition, while not shown in FIG. 15, additional support layers may be included in the FIG. 15 aspect, similar to the additional support layers shown in FIG. 14. Thus, with the arrangement of FIG. 15, the strut preform 306 being inserted as described above, the strut preform 306 defines a first strut preform portion 306a and a second strut preform portion 306b.

Figures 16, 17:
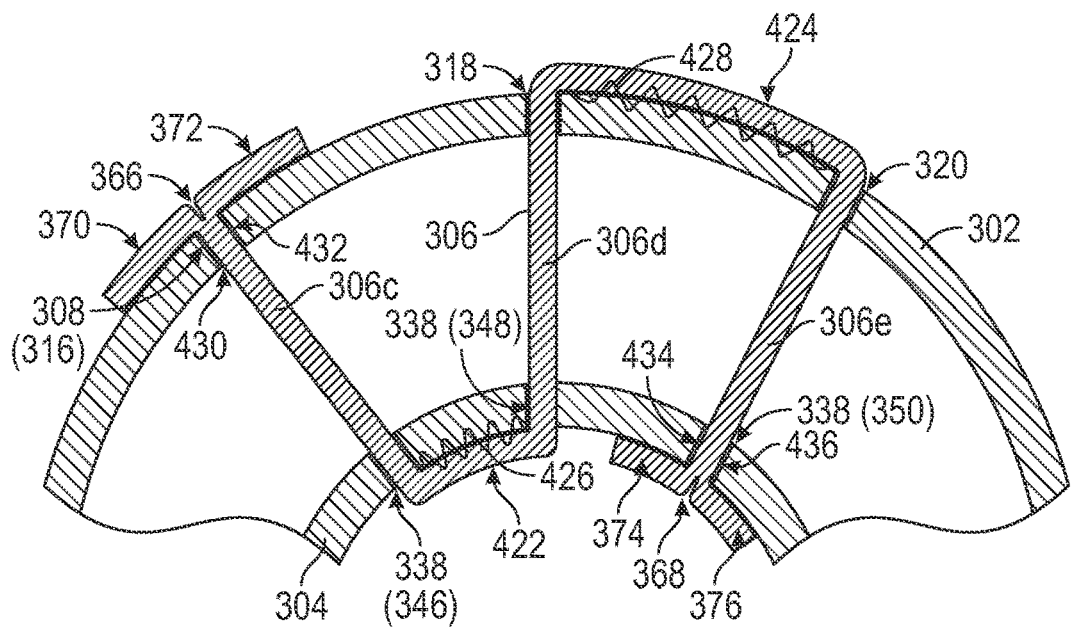
FIG. 16 is a detailed cross-sectional view of a portion of the preform assembly, taken at detail view 420 of FIG. 7, according to an aspect of the present disclosure.
FIG. 17 is a schematic view of a mold tooling structure 440 that may be utilized in manufacturing the vane structure of FIG. 4, according to an aspect of the present disclosure.

FIG. 16 is a detailed cross-sectional view of a portion of the preform assembly 300 taken at detail view 420 of FIG. 7, rotated one-hundred-eighty degrees about the centerline axis 101', according to an aspect of the present disclosure. In FIG. 16, the strut preform 306 is configured to form multiple struts (vanes), and, in particular, is configured to form three struts (vanes). To be capable of forming the three struts, the length 384 (FIG. 12) of the strut preform is longer for the FIG. 16 aspect than that for the FIG. 15 aspect that formed two struts. In FIG. 16, the strut preform 306 is assembled to the outer shell hoop preform 302 and to the inner hub hoop preform 304 by inserting the second end 368 through the fourth outer shell strut slot 316, through the fourth inner hub strut slot 346, then through the fifth inner hub strut slot 348, then through the fifth outer shell strut slot 318, then through the sixth outer shell strut slot 320, and finally through the sixth inner hub strut slot 350. Thus, a first middle portion 422 of the strut preform 306 extends across (overlays) the inner hub hoop preform 304 between the fourth inner hub strut slot 346 and the fifth inner hub strut slot 348, and a second middle portion 424 of the strut preform 306 overlays the outer shell hoop preform 302 between the fifth outer shell strut slot 318 and the sixth outer shell strut slot 320. The overlaying first middle portion 422 of the strut preform 306 may be stitched to the inner hub hoop preform 304 with a stitching 426, and the overlaying second middle portion 424 of the strut preform 306 may be stitched to the outer shell hoop preform 302 with a stitching 428.

At the first end 366, the first bifurcated end portion 370 and the second bifurcated end portion 372 are splayed, with the first bifurcated end portion 370 being overlayed onto the outer shell hoop preform 302 on a first side 430 of the fourth outer shell strut slot 316, and the second bifurcated end portion 372 being overlayed onto the outer shell hoop preform 302 on a second side 432 of the fourth outer shell strut slot 316. Similarly, at the second end 368 of the strut preform 306, the third bifurcated end portion 374 and the fourth bifurcated end portion 376 are splayed, with the third bifurcated end portion 374 being overlayed onto the inner hub hoop preform 304 on a first side 434 of the sixth inner hub strut slot 350 and the fourth bifurcated end portion 376 being overlayed onto the inner hub hoop preform 304 on a second side 436 of the sixth inner hub strut slot 350. While not shown in FIG. 16, each of the first bifurcated end portion 370 and the second bifurcated end portion 372 may be stitched to the outer shell hoop preform 302 in the same manner as shown in FIG. 14. Similarly, the third bifurcated end portion 374, and the fourth bifurcated end portion 376 may be stitched to the inner hub hoop preform 304 in the same manner as shown in FIG. 14. In addition, while not shown in FIG. 16, additional support layers may be included in the FIG. 16 aspect, similar to the additional support layers shown in FIG. 14. Thus, with the arrangement of FIG. 16, the strut preform 306 being inserted as described above, the strut preform 306 defines a first strut preform portion 306c, a second strut preform portion 306d, and a third strut preform portion 306e.

FIG. 17 is a schematic view of a mold tooling structure 440 that may be utilized in manufacturing the vane structure 161 of FIG. 4, according to an aspect of the present disclosure. The mold tooling structure 440 includes an outer shell mold portion 442 for forming the outer shell 165 (FIG. 4), an inner hub mold portion 444 for forming the inner hub 167 (FIG. 4), and a plurality of strut mold portions 446 for forming the vanes (struts) 158. The preform assembly 300 is assembled as described above with regard to any of FIGS. 14 to 16, and the assembly may be performed utilizing the mold tooling structure 440. For example, the outer shell hoop preform 302 may be assembled onto the outer shell mold portion 442, and the inner hub hoop preform 304 may be assembled onto the inner hub mold portion 444, and then each of the strut preforms 306 may be assembled onto the outer shell hoop preform 302 and onto the inner hub hoop preform 304. The additional support layers may also be assembled to the preform assembly 300 as described above with regard to FIG. 14. A matrix material (as described above) may then be injected into the mold tooling structure 440 via one or more injectors 448 to generate an impregnated preform assembly within the mold tooling structure 440. A curing process may then be applied to the impregnated preform assembly within the mold tooling structure 440. For example, the mold tooling structure 440 may include the ability to apply pressure and heat to the impregnated preform assembly to apply the curing process, or the mold tooling structure 440 may be provided to an autoclave to institute a curing process.

Figure 18:
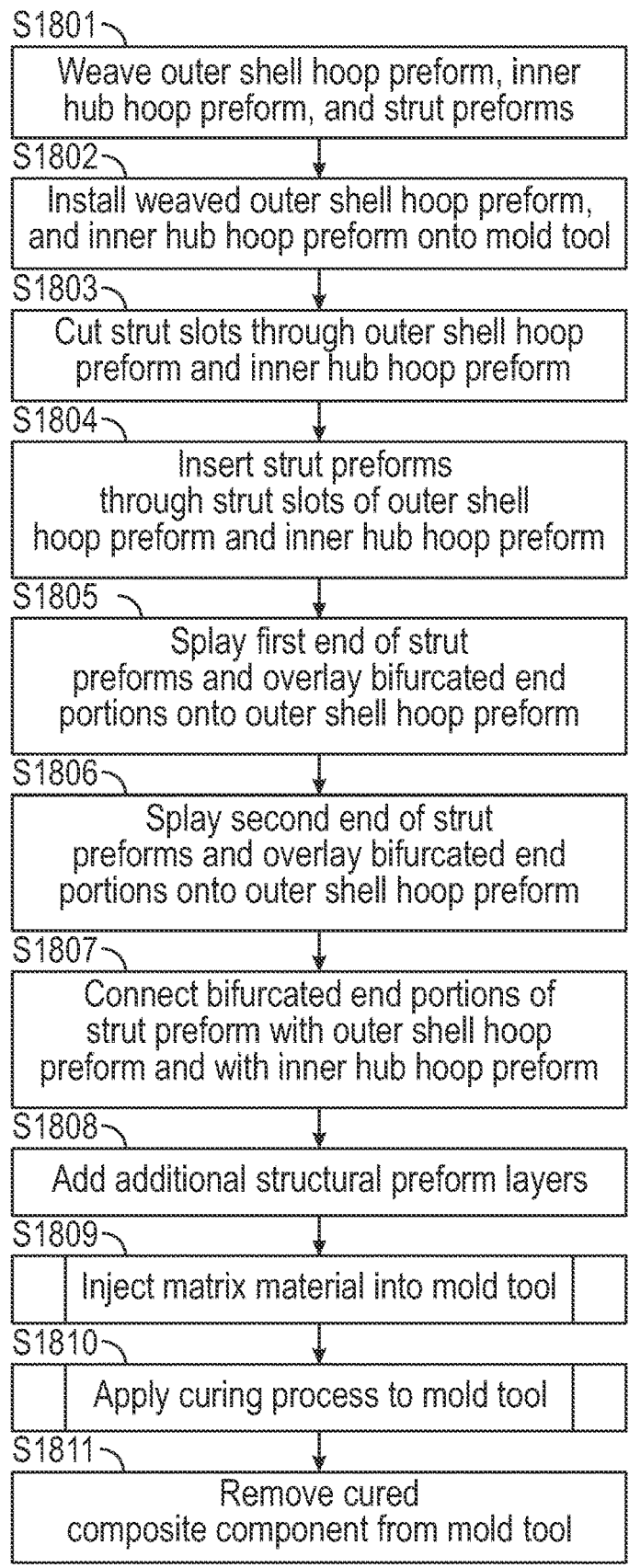
FIG. 18 is a flowchart of process steps for implementing a method of manufacturing a composite component, according to an aspect of the present disclosure.

FIG. 18 is a flowchart of process steps for implementing a method of manufacturing a composite component, according to an aspect of the present disclosure. In step S1801, the outer shell hoop preform 302 is woven, the inner hub hoop preform 304 is woven, and the plurality of strut preforms 306 are woven. Each of the outer shell hoop preform 302, the inner hub hoop preform 304, and the plurality of strut preforms 306 are woven as three-dimensional woven fabric preforms as described above for any of FIGS. 2A through 2D and FIG. 3. In step S1802, the three-dimensional woven fabric outer shell hoop preform 302 and the three-dimensional woven fabric inner hub preform 304 may be installed on the mold tooling structure 440 (FIG. 17) for assembling the preform assembly 300 (FIG. 7). In step 1803, the outer shell strut slots 308 (FIGS. 8 to 9B) and the inner hub strut slots 338 (FIGS. 10 to 11B) may be cut through the outer shell hoop preform 302 and through the inner hub hoop preform 304, respectively. Alternatively, in the case when, as described above, the outer shell strut slots 308 are woven into the outer shell hoop preform 302, or when the inner hub strut slots 338 are woven into the inner hub hoop preform 304, step S1803 may be skipped.

Next, in step S1804, the strut preforms 306 are inserted through the outer shell strut slots 308 of the outer shell hoop preform 302 and through the inner hub strut slots 338 of the inner hub hoop preform 304. This process is performed as described above for any of FIGS. 14 through 16. Then, in step S1805, for each strut preform 306, the first bifurcated end portion 370 and the second bifurcated end portion 372 of first end 366 are splayed. As described above for FIGS. 14 to 16, the first bifurcated end portion 370 and the second bifurcated end portion 372 are overlayed onto the outer shell hoop preform 302. Similarly, in step S1806, as described above, the third bifurcated end portion 374 and the fourth bifurcated end portion 376 are splayed and are overlayed onto one of either the outer shell hoop preform 302 (FIG. 15) or the inner hub hoop preform 304 (FIGS. 14 and 16). In step S1807, the overlayed first bifurcated end portion 370 and the second bifurcated end portion 372 may be connected (e.g., stitched) with the outer shell hoop preform 302, and the overlayed third bifurcated end portion 374 and the fourth bifurcated end portion 376 may be connected (e.g., stitched) with either the inner hub hoop portion (FIGS. 14 and 16) or with the outer shell hoop preform 302 (FIG. 15). Of course, other techniques, other than stitching, for forming the connection could be implemented instead. At this stage, the preform assembly 300 is formed within the mold tooling structure 440.

Next, in step S1808, as shown in FIG. 14, the additional structural preform support layers 394, 396, 398, 400 and 402 can be overlayed onto the preform assembly 300 so as to build-up the preform structure for the composite component part being formed. In step 1809, a process to inject a matrix material into the mold tooling structure 440 is performed. The matrix material may be any of those described herein. Any one or more of various known processes of injecting matrix materials into a mold for forming a composite component can be implemented. Then, in step S1810, a curing process is applied to the mold tooling structure as described with regard to FIG. 17. Finally, in step S1811, once the curing process has been completed, the cured composite component part can be removed from the mold tooling structure 440, and any additional manufacturing processes that may be needed to complete the composite component part (i.e., the vane structure 161 of FIG. 4) can be performed.

Further aspects of the present disclosure are provided by the subject matter of the following clauses.

A method of manufacturing a composite component for a gas turbine engine, the composite component including an outer shell extending circumferentially about a centerline axis, an inner hub extending circumferentially about the centerline axis, and a plurality of circumferentially spaced apart struts connecting the outer shell and the inner hub, the method comprising installing an outer shell hoop preform on a mold tooling structure, the outer shell hoop preform being constructed of a woven fabric and including a plurality of outer shell strut slots therethrough, installing an inner hub hoop preform on the mold tooling structure, the inner hub hoop preform being constructed of a woven fabric and including a plurality of inner hub strut slots therethrough, inserting a strut preform through at least one of the plurality of outer shell strut slots, and through at least one of the plurality of inner hub strut slots, the strut preform being constructed of a woven fabric and including a first end and a second end, overlaying the first end of the strut preform over one of the outer shell hoop preform or the inner hub hoop preform, and overlaying the second end of the strut preform over one of the outer shell hoop preform or the inner hub hoop preform, injecting a matrix material into the mold tooling structure, and applying a curing process to the mold tooling structure to obtain a molded composite component.

The method according to the preceding clause, further comprising weaving the outer shell hoop preform, the outer shell hoop preform being woven as one of a three-dimensional woven fabric, a two-dimensional woven fabric, or a braided woven fabric, weaving the inner hub hoop preform, the inner hub hoop preform being woven as one of a three-dimensional woven fabric, a two-dimensional woven fabric, or a braided woven fabric, and weaving the strut preform to include a first bifurcated end portion and a second bifurcated end portion at a first end of the strut preform, and to include a third bifurcated end portion and a fourth bifurcated end portion at a second end of the strut preform opposite the first end of the strut preform, the strut preform being woven as one of a three-dimensional woven fabric, a two-dimensional woven fabric, or a braided woven fabric.

The method according to any preceding clause, further comprising cutting the plurality of the outer shell strut slots through the outer shell hoop preform, and cutting the plurality of the inner hub strut slots through the inner hub hoop preform.

The method according to any preceding clause, wherein in the case when the outer shell hoop preform and the inner hub hoop preform are woven as the three-dimensional woven fabric, (a) the outer shell hoop preform being woven with warp fiber tows extending in a hoop direction, with weft fiber tows extending in a longitudinal direction, and with interlocking fiber tows extending in a thickness direction, and (b) the inner hub hoop preform is woven with warp fiber tows extending in the hoop direction, with weft fiber tows extending in the longitudinal direction, and with interlocking fiber tows extending in the thickness direction.

The method according to any preceding clause, wherein in the case when the strut preform is woven as the two-dimensional woven fabric, the strut preform being constructed of a plurality of two-dimensional woven fabric layers, and a middle portion of the plurality of two-dimensional woven fabric layers are stitched together.

The method according to any preceding clause, wherein the first end of the strut preform including a first bifurcated end portion and a second bifurcated end portion, and the second end of the strut preform includes a third bifurcated end portion and a fourth bifurcated end portion.

The method according to any preceding clause, wherein the strut preform being inserted through a first outer shell strut slot, through a first inner hub strut slot, through a second inner hub strut slot, and through a second outer shell strut slot, the first end of the strut preform and the second end of the strut preform being overlayed onto the outer shell hoop preform.

The method according to any preceding clause, further comprising splaying the first bifurcated end portion and the second bifurcated end portion of the first end of the strut preform, and overlaying the first bifurcated end portion onto the outer shell hoop preform on a first side of the first outer shell strut slot, and overlaying the second bifurcated end portion onto the outer shell hoop preform on a second side of the first outer shell strut slot, and splaying the third bifurcated end portion and the fourth bifurcated end portion of the second end of the strut preform, and overlaying the third bifurcated end portion onto the outer shell hoop preform on a first side of the second outer shell strut slot, and overlaying the fourth bifurcated end portion onto the outer shell hoop preform on a second side of the second outer shell strut slot.

The method according to any preceding clause, wherein the strut preform being inserted through a first outer shell strut slot, through a first inner hub strut slot, through a second inner hub strut slot, through a second outer shell strut slot, through a third outer shell strut slot, and through a third inner hub strut slot, the first end of the strut preform being overlayed onto the outer shell hoop preform and the second end of the strut preform being overlayed onto the inner hub hoop preform.

The method according to any preceding clause, further comprising splaying the first bifurcated end portion and the second bifurcated end portion of the first end of the strut preform, and overlaying the first bifurcated end portion onto the outer shell hoop preform on a first side of the first outer shell strut slot, and overlaying the second bifurcated end portion onto the outer shell hoop preform on a second side of the first outer shell strut slot, and splaying the third bifurcated end portion and the fourth bifurcated end portion of the second end of the strut preform, and overlaying the third bifurcated end portion onto the inner hub hoop preform on a first side of the third inner hub strut slot, and overlaying the fourth bifurcated end portion onto the inner hub hoop preform on a second side of the third inner hub strut slot.

The method according to any preceding clause, wherein the first end being overlayed onto the outer shell hoop preform, and the second end is overlayed onto the inner hub hoop preform.

The method according to any preceding clause, wherein the strut preform being inserted through one outer shell strut slot and through one inner hub strut slot, and the first end of the strut preform is overlayed onto the outer shell hoop preform, and the second end of the strut preform is overlayed onto the inner hub hoop preform.

The method according to any preceding clause, further comprising splaying the first bifurcated end portion and the second bifurcated end portion of the first end of the strut preform, and overlaying the first bifurcated end portion onto the outer shell hoop preform on a first side of the one outer shell strut slot, and overlaying the second bifurcated end portion onto the outer shell hoop preform on a second side of the one outer shell strut slot, and splaying the third bifurcated end portion and the fourth bifurcated end portion of the second end of the strut preform, and overlaying the third bifurcated end portion onto the inner hub hoop preform on a first side of the one inner hub strut slot, and overlaying the fourth bifurcated end portion onto the inner hub hoop preform on a second side of the one inner hub strut slot.

The method according to any preceding clause, further comprising performing a stitching process to stitch the first bifurcated end portion and the second bifurcated end portion to the outer shell hoop preform.

The method according to any preceding clause, further comprising performing a stitching process to stitch the third bifurcated end portion and the fourth bifurcated end portion to the inner hub hoop preform.

The method according to any preceding clause further including adding additional preform layers to at least one of the outer shell hoop preform, the inner hub hoop preform, or at least one of the plurality of strut preforms.

The method according to any preceding clause, wherein the additional preform layers are added to an outer side of the outer shell hoop preform.

The method according to any preceding clause, where the additional preform layers are added to an inner side of the inner hub hoop preform.

The method according to any preceding clause, wherein the additional layers are added to an inner side of the outer shell hoop preform between respective pairs of the plurality of strut preforms.

The method according to any preceding clause, wherein the additional layers are added to an outer side of the inner hub hoop preform between respective pairs of the plurality of strut preforms.

A composite component for a gas turbine engine, the composite component comprising an outer shell extending circumferentially about a centerline axis, the outer shell being constructed of a woven fabric outer shell hoop preform including a plurality of outer shell strut slots therethrough, an inner hub extending circumferentially about the centerline axis, the inner hub being constructed of a woven fabric inner hub hoop preform including a plurality of inner hub strut slots therethrough, and at least one strut connecting the outer shell and the inner hub, the at least one strut being constructed of a woven fabric strut preform having a first end that includes a first bifurcated end portion and a second bifurcated end portion, and a second end that includes a third bifurcated end portion and a fourth bifurcated end portion, and the strut preform being inserted through at least one of the plurality of outer shell strut slots and through at least one of the inner hub strut slots.

The composite component according to any preceding clause, wherein the outer shell hoop preform, the inner hub hoop preform, and the strut preform being respectively woven as one of a three-dimensional woven fabric, a two-dimensional woven fabric, or a braided woven fabric.

The composite component according to any preceding clause, wherein the strut preform being inserted through one outer shell strut slot and through one inner hub strut slot, and the first end is overlayed onto the outer shell hoop preform, and the second end is overlayed onto the inner hub hoop preform, the first bifurcated end portion being overlayed onto the outer shell hoop preform on a first side of the one outer shell strut slot, and the second bifurcated end portion being overlayed onto the outer shell hoop preform on a second side of the one outer shell strut slot, and the third bifurcated end portion being overlayed onto the inner hub hoop preform on a first side of the one inner hub strut slot, and the fourth bifurcated end portion being overlayed onto the inner hub hoop preform on a second side of the one inner hub strut slot.

The composite component according to any preceding clause, wherein the strut preform being inserted through a first outer shell strut slot, through a first inner hub strut slot, through a second inner hub strut slot, and through a second outer shell strut slot, thereby defining a first strut and a second strut, the first bifurcated end portion being overlayed onto the outer shell hoop preform on a first side of the first outer shell strut slot, and the second bifurcated end portion being overlayed onto the outer shell hoop preform on a second side of the first outer shell strut slot, and the third bifurcated end portion being overlayed onto the outer shell hoop preform on a first side of the second outer shell strut slot, and the fourth bifurcated end portion being overlayed onto the outer shell hoop preform on a second side of the second outer shell strut slot.

The composite component according to any preceding clause, wherein the strut preform being inserted through a first outer shell strut slot, through a first inner hub strut slot, through a second inner hub strut slot, through a second outer shell strut slot, through a third outer shell strut slot, and through a third inner hub strut slot, thereby defining a first strut preform portion, a second strut preform portion, and a third strut preform portion, the first bifurcated end portion is overlayed onto the outer shell hoop preform on a first side of the first outer shell strut slot, and the second bifurcated end portion is overlayed onto the outer shell hoop preform on a second side of the first outer shell strut slot, and the third bifurcated end portion is overlayed onto the inner hub hoop preform on a first side of the third inner hub strut slot, and the fourth bifurcated end portion is overlayed onto the inner hub hoop preform on a second side of the third inner hub strut slot.

The composite component according to any preceding clause, wherein composite component is a guide vane assembly.

The composite component according to any preceding clause further including additional preform layers added to at least one of the outer shell hoop preform, the inner hub hoop preform, or at least one of the plurality of strut preforms.

The composite component according to any preceding clause, wherein the additional preform layers are added to an outer side of the outer shell hoop preform.

The composite component according to any preceding clause, where the additional preform layers are added to an inner side of the inner hub hoop preform.

The composite component according to any preceding clause, wherein the additional layers are added to an inner side of the outer shell hoop preform between respective pairs of the plurality of strut preforms.

The composite component according to any preceding clause, wherein the additional layers are added to an outer side of the inner hub hoop preform between respective pairs of the plurality of strut preforms.

A gas turbine engine, including a fan section, a turbo-engine arranged to drive the fan section, a nacelle surrounding the fan section and at least a portion of the turbo-engine, and an outlet guide vane structure arranged downstream of the fan section and extending between the nacelle and the turbo-engine, the outlet guide vane structure being a composite component comprising an outer shell extending circumferentially about a centerline axis, the outer shell being constructed of a woven fabric outer shell hoop preform including a plurality of outer shell strut slots therethrough, an inner hub extending circumferentially about the centerline axis, the inner hub being constructed of a woven fabric inner hub hoop preform including a plurality of inner hub strut slots therethrough, and at least one strut connecting the outer shell and the inner hub, the at least one strut being constructed of a woven fabric strut preform having a first end that includes a first bifurcated end portion and a second bifurcated end portion, and a second end that includes a third bifurcated end portion and a fourth bifurcated end portion, and the strut preform being inserted through at least one of the plurality of outer shell strut slots and through at least one of the inner hub strut slots.

The gas turbine engine according to the preceding clause, wherein the outer shell hoop preform, the inner hub hoop preform, and the strut preform being respectively woven as one of a three-dimensional woven fabric, a two-dimensional woven fabric, or a braided woven fabric.

The gas turbine engine according to any preceding clause, wherein the strut preform being inserted through one outer shell strut slot and through one inner hub strut slot, and the first end is overlayed onto the outer shell hoop preform, and the second end is overlayed onto the inner hub hoop preform, the first bifurcated end portion being overlayed onto the outer shell hoop preform on a first side of the one outer shell strut slot, and the second bifurcated end portion being overlayed onto the outer shell hoop preform on a second side of the one outer shell strut slot, and the third bifurcated end portion being overlayed onto the inner hub hoop preform on a first side of the one inner hub strut slot, and the fourth bifurcated end portion being overlayed onto the inner hub hoop preform on a second side of the one inner hub strut slot.

The gas turbine engine according to any preceding clause, wherein the strut preform being inserted through a first outer shell strut slot, through a first inner hub strut slot, and through a second outer shell strut slot, thereby defining a first strut and a second strut, the first bifurcated end portion being overlayed onto the outer shell hoop preform on a first side of the first outer shell strut slot, and the second bifurcated end portion being overlayed onto the outer shell hoop preform on a second side of the first outer shell strut slot, and the third bifurcated end portion being overlayed onto the outer shell hoop preform on a first side of the second outer shell strut slot, and the fourth bifurcated end portion being overlayed onto the outer shell hoop preform on a second side of the second outer shell strut slot.

The gas turbine engine according to any preceding clause, wherein the strut preform being inserted through a first outer shell strut slot, through a first inner hub strut slot, through a second inner hub strut slot, through a second outer shell strut slot, through a third outer shell strut slot, and through a third inner hub strut slot, thereby defining a first strut preform portion, a second strut preform portion, and a third strut preform portion, the first bifurcated end portion is overlayed onto the outer shell hoop preform on a first side of the first outer shell strut slot, and the second bifurcated end portion is overlayed onto the outer shell hoop preform on a second side of the first outer shell strut slot, and the third bifurcated end portion is overlayed onto the inner hub hoop preform on a first side of the third inner hub strut slot, and the fourth bifurcated end portion is overlayed onto the inner hub hoop preform on a second side of the third inner hub strut slot.

The gas turbine engine according to any preceding clause, wherein the turbo-engine includes an inlet guide vane assembly, the inlet guide vane assembly being constructed as a composite component comprising an outer shell extending circumferentially about a centerline axis, the outer shell being constructed of a woven fabric outer shell hoop preform including a plurality of outer shell strut slots therethrough, an inner hub extending circumferentially about the centerline axis, the inner hub being constructed of a woven fabric inner hub hoop preform including a plurality of inner hub strut slots therethrough, and at least one strut connecting the outer shell and the inner hub, the at least one strut being constructed of a woven fabric strut preform having a first end that includes a first bifurcated end portion and a second bifurcated end portion, and a second end that includes a third bifurcated end portion and a fourth bifurcated end portion, and the strut preform being inserted through at least one of the plurality of outer shell strut slots and through at least one of the inner hub strut slots.

The gas turbine engine according to any preceding clause further including additional preform layers added to at least one of the outer shell hoop preform, the inner hub hoop preform, or at least one of the plurality of strut preforms.

The gas turbine engine according to any preceding clause, wherein the additional preform layers are added to an outer side of the outer shell hoop preform.

The gas turbine engine according to any preceding clause, where the additional preform layers are added to an inner side of the inner hub hoop preform.

The gas turbine engine according to any preceding clause, wherein the additional layers are added to an inner side of the outer shell hoop preform between respective pairs of the plurality of strut preforms.

The gas turbine engine according to any preceding clause, wherein the additional layers are added to an outer side of the inner hub hoop preform between respective pairs of the plurality of strut preforms.

Although the foregoing description is directed to the preferred embodiments, other variations and modifications will be apparent to those skilled in the art, and may be made without departing from the disclosure. Moreover, features described in connection with one embodiment may be used in conjunction with other embodiments, even if not explicitly stated above.

The invention claimed is:

1. A method of manufacturing a composite component for a gas turbine engine, the composite component including an outer shell extending circumferentially about a centerline axis, an inner hub extending circumferentially about the centerline axis, and a plurality of circumferentially spaced apart struts connecting the outer shell and the inner hub, the method comprising:
    installing an outer shell hoop preform on a mold tooling structure, the outer shell hoop preform being constructed of a woven fabric and including a plurality of outer shell strut slots therethrough;
    installing an inner hub hoop preform on the mold tooling structure, the inner hub hoop preform being constructed of a woven fabric and including a plurality of inner hub strut slots therethrough;
    inserting a strut preform through at least one of the plurality of outer shell strut slots, and through at least one of the plurality of inner hub strut slots, the strut preform being constructed of a woven fabric and including a first end and a second end;
    overlaying the first end of the strut preform over one of the outer shell hoop preform or the inner hub hoop preform, and overlaying the second end of the strut preform over one of the outer shell hoop preform or the inner hub hoop preform;
    injecting a matrix material into the mold tooling structure; and
    applying a curing process to the mold tooling structure to obtain a molded composite component.

2. The method according to claim 1, wherein, in a case when the strut preform is woven as a two-dimensional woven fabric, the strut preform is constructed of a plurality of two-dimensional woven fabric layers, and a middle portion of the plurality of two-dimensional woven fabric layers are stitched together.

3. The method according to claim 1, further comprising:
    weaving the outer shell hoop preform, the outer shell hoop preform being woven as one of a three-dimensional woven fabric, a two-dimensional woven fabric, or a braided woven fabric;
    weaving the inner hub hoop preform, the inner hub hoop preform being woven as one of a three-dimensional woven fabric, a two-dimensional woven fabric, or a braided woven fabric; and
    weaving the strut preform to include a first bifurcated end portion and a second bifurcated end portion at the first end of the strut preform, and to include a third bifurcated end portion and a fourth bifurcated end portion at the second end of the strut preform opposite the first end of the strut preform, the strut preform being woven as one of a three-dimensional woven fabric, a two-dimensional woven fabric, or a braided woven fabric.

4. The method according to claim 3, further comprising:
    cutting the plurality of the outer shell strut slots through the outer shell hoop preform; and
    cutting the plurality of the inner hub strut slots through the inner hub hoop preform.

5. The method according to claim 3, wherein, in the case when the outer shell hoop preform and the inner hub hoop preform are woven as the three-dimensional woven fabric, (a) the outer shell hoop preform is woven with warp fiber tows extending in a hoop direction, with weft fiber tows extending in a longitudinal direction, and with interlocking fiber tows extending in a thickness direction, and (b) the inner hub hoop preform is woven with warp fiber tows extending in the hoop direction, with weft fiber tows extending in the longitudinal direction, and with interlocking fiber tows extending in the thickness direction.

6. The method according to claim 1, wherein the first end of the strut preform includes a first bifurcated end portion and a second bifurcated end portion, and the second end of the strut preform includes a third bifurcated end portion and a fourth bifurcated end portion.

7. The method according to claim 6, wherein the strut preform is inserted through a first outer shell strut slot, through a first inner hub strut slot, through a second inner hub strut slot, and through a second outer shell strut slot, the first end of the strut preform and the second end of the strut preform being overlayed onto the outer shell hoop preform.

8. The method according to claim 7, further comprising:
    splaying the first bifurcated end portion and the second bifurcated end portion of the first end of the strut preform, and overlaying the first bifurcated end portion onto the outer shell hoop preform on a first side of the first outer shell strut slot, and overlaying the second bifurcated end portion onto the outer shell hoop preform on a second side of the first outer shell strut slot; and
    splaying the third bifurcated end portion and the fourth bifurcated end portion of the second end of the strut preform, and overlaying the third bifurcated end portion onto the outer shell hoop preform on a first side of the second outer shell strut slot, and overlaying the fourth bifurcated end portion onto the outer shell hoop preform on a second side of the second outer shell strut slot.

9. The method according to claim 6, wherein the strut preform is inserted through a first outer shell strut slot, through a first inner hub strut slot, through a second inner hub strut slot, through a second outer shell strut slot, through a third outer shell strut slot, and through a third inner hub strut slot, the first end of the strut preform being overlayed onto the outer shell hoop preform and the second end of the strut preform being overlayed onto the inner hub hoop preform.

10. The method according to claim 9, further comprising:
    splaying the first bifurcated end portion and the second bifurcated end portion of the first end of the strut preform, and overlaying the first bifurcated end portion onto the outer shell hoop preform on a first side of the first outer shell strut slot, and overlaying the second bifurcated end portion onto the outer shell hoop preform on a second side of the first outer shell strut slot; and
    splaying the third bifurcated end portion and the fourth bifurcated end portion of the second end of the strut preform, and overlaying the third bifurcated end portion onto the inner hub hoop preform on a first side of the third inner hub strut slot, and overlaying the fourth bifurcated end portion onto the inner hub hoop preform on a second side of the third inner hub strut slot.

11. The method according to claim 6, wherein the first end is overlayed onto the outer shell hoop preform, and the second end is overlayed onto the inner hub hoop preform.

12. The method according to claim 11, wherein the strut preform is inserted through one outer shell strut slot and through one inner hub strut slot, and the first end of the strut preform is overlayed onto the outer shell hoop preform, and the second end of the strut preform is overlayed onto the inner hub hoop preform.

13. The method according to claim 12, further comprising:
   splaying the first bifurcated end portion and the second bifurcated end portion of the first end of the strut preform, and overlaying the first bifurcated end portion onto the outer shell hoop preform on a first side of the one outer shell strut slot, and overlaying the second bifurcated end portion onto the outer shell hoop preform on a second side of the one outer shell strut slot; and
   splaying the third bifurcated end portion and the fourth bifurcated end portion of the second end of the strut preform, and overlaying the third bifurcated end portion onto the inner hub hoop preform on a first side of the one inner hub strut slot, and overlaying the fourth bifurcated end portion onto the inner hub hoop preform on a second side of the one inner hub strut slot.

14. The method according to claim 13, further comprising performing a stitching process to stitch the first bifurcated end portion and the second bifurcated end portion to the outer shell hoop preform.

15. The method according to claim 14, further comprising performing a stitching process to stitch the third bifurcated end portion and the fourth bifurcated end portion to the inner hub hoop preform.

* * * * *